(12) United States Patent
Miller et al.

(10) Patent No.: US 7,720,630 B1
(45) Date of Patent: May 18, 2010

(54) PERSONALIZED TRANSPORTATION INFORMATION SYSTEM

(75) Inventors: Mark D. Miller, Nashua, NH (US); George Rene Desrochers, Georgetown, MA (US); Glen J. Stump, Andover, MA (US)

(73) Assignee: WSI Corporation, Andover, MA (US)

( * ) Notice: Subject to any disclaimer, the term of this patent is extended or adjusted under 35 U.S.C. 154(b) by 477 days.

(21) Appl. No.: 11/445,647

(22) Filed: Jun. 2, 2006

Related U.S. Application Data

(60) Provisional application No. 60/686,687, filed on Jun. 2, 2005.

(51) Int. Cl.
*G01C 9/00* (2006.01)
(52) U.S. Cl. .................................... 702/150
(58) Field of Classification Search ................ 702/150
See application file for complete search history.

(56) References Cited

U.S. PATENT DOCUMENTS

| | | | |
|---|---|---|---|
| 5,265,024 A | | 11/1993 | Crabill |
| 5,619,211 A | * | 4/1997 | Horkin et al. .......... 342/357.17 |
| 5,771,484 A | * | 6/1998 | Tognazzini ................ 701/117 |
| 5,999,882 A | | 12/1999 | Simpson |
| 6,199,008 B1 | | 3/2001 | Aratow et al. |
| 6,289,277 B1 | | 9/2001 | Feyereisen |
| 6,317,686 B1 | | 11/2001 | Ran |
| 6,381,538 B1 | | 4/2002 | Robinson |
| 6,650,972 B1 | | 11/2003 | Robinson |
| 6,711,548 B1 | | 3/2004 | Rosenblatt |
| 6,721,714 B1 | | 4/2004 | Baiada et al. |
| 6,940,426 B1 | | 9/2005 | Vaida |
| 7,027,801 B1 | | 4/2006 | Hall et al. |
| 7,089,115 B2 | | 8/2006 | Chapman |
| 7,194,353 B1 | | 3/2007 | Baldwin et al. |
| 2002/0039072 A1 | | 4/2002 | Gremmert et al. |
| 2002/0128021 A1 | * | 9/2002 | Kikinis et al. ............... 455/456 |
| 2002/0128773 A1 | | 9/2002 | Chowanic |
| 2003/0078719 A1 | | 4/2003 | Zobell |
| 2003/0109266 A1 | | 6/2003 | Rafiah et al. |
| 2004/0044445 A1 | | 3/2004 | Burdon |
| 2004/0183695 A1 | | 9/2004 | Rouokangas et al. |
| 2005/0288856 A1 | * | 12/2005 | Uyeki et al. ................ 701/210 |
| 2006/0059024 A1 | | 3/2006 | Bailey et al. |
| 2006/0143959 A1 | * | 7/2006 | Stehle et al. ................ 40/600 |
| 2006/0168592 A1 | | 7/2006 | Andrews |
| 2006/0259234 A1 | | 11/2006 | Flynn |

OTHER PUBLICATIONS

"On-demand air travel takes off", http://money.cnn.com, Apr. 25, 2005, 2 pgs.

\* cited by examiner

*Primary Examiner*—Aditya Bhat
(74) *Attorney, Agent, or Firm*—Carlineo, Spicer & Kee, LLC

(57) ABSTRACT

A computer-implemented method of providing personalized weather and transportation information includes receiving operational parameters, a user profile, and weather data. Personalized weather and transportation information is derived based on the received weather, operational parameters, and the user profile. The personalized weather and transportation information is presented to a user.

25 Claims, 31 Drawing Sheets
(13 of 31 Drawing Sheet(s) Filed in Color)

PERSONALIZED TRANSPORTATION INFORMATION SYSTEM

CROSS REFERENCE TO RELATED APPLICATIONS

This application claims the benefit of U.S. Provisional Patent Application No. 60/686,687, filed Jun. 2, 2005, and entitled Weather-based Personalized Transportation Information System, the entire disclosure of which is incorporated herein by reference.

This application is related to co-pending U.S. application Ser. No. 11/445,759, entitled System and Method for Suggesting Transportation Routes, filed Jun. 2, 2006; U.S. application Ser. No. 11/445,562, entitled Visualization of Transportation Information, filed Jun. 2, 2006; U.S. application Ser. No. 11/445,814, entitled Customized Travel Briefings, filed Jun. 2, 2006; U.S. application Ser. No. 11/445,547, entitled Customized Transportation Alerts, filed Jun. 2, 2006; U.S. application Ser. No. 11/446,101, entitled Evaluation of Transportation-Related Business Objectives, filed Jun. 2, 2006; and U.S. application Ser. No. 11/445,666, entitled System and Method of Marketing Services by a Transportation Service Provider, filed Jun. 2, 2006, the entire disclosures of which are incorporated herein by reference.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BRIEF DESCRIPTION OF THE DRAWINGS

The following detailed description will be better understood when read in conjunction with the appended drawings, in which there is shown one or more of the multiple embodiments of the present invention. It should be understood, however, that the various embodiments of the present invention are not limited to the precise arrangements and instrumentalities shown in the drawings.

The patent or application file contains at least one drawing executed in color. Copies of this patent or patent application publication with color drawing(s) will be provided by the Office upon request and payment of the necessary fee.

DETAILED DESCRIPTION

Figure 1:
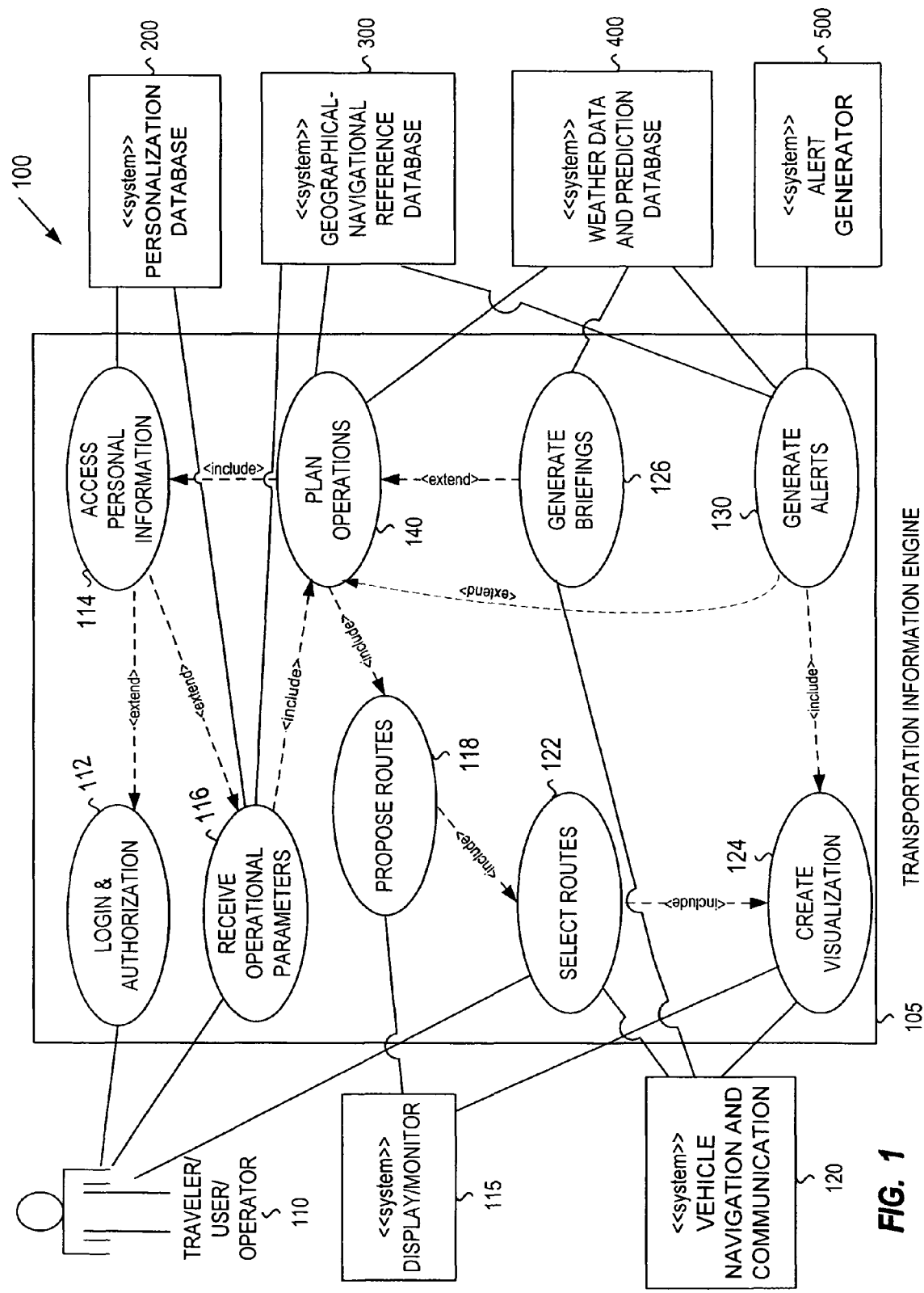
FIG. 1 is a Unified Modeling Language ("UML") diagram of the personalized transportation information system according to one embodiment of the present invention.

Certain terminology is used herein for convenience only and is not to be taken as a limitation on the embodiments of the present invention. In the drawings, the same reference letters are employed for designating the same elements throughout the several figures.

The words "right", "left", "lower" and "upper" designate directions in the drawings to which reference is made. The words "inwardly" and "outwardly" refer to directions toward and away from, respectively, the geometric center of the personalized transportation information system and designated parts thereof. The terminology includes the words above specifically mentioned, derivatives thereof and words of similar import.

Unified Modeling Language ("UML") can be used to model and/or describe methods and systems and provide the basis for better understanding their functionality and internal operation as well as describing interfaces with external components, systems and people using standardized notation. When used herein, UML diagrams including, but not limited to, use case diagrams, class diagrams and activity diagrams, are meant to serve as an aid in describing the embodiments of the present invention, but do not constrain implementation thereof to any particular hardware or software embodiments. Unless otherwise noted, the notation used with respect to the UML diagrams contained herein is consistent with the UML 2.0 specification or variants thereof and is understood by those skilled in the art.

The personalized transportation information system 100 combines and processes route, weather, traffic, operation, business and other transportation-related information collected from different sources to generate a visualized transportation plan that is based on current weather conditions and/or predictions and which is personalized to the user. The transportation plan obtained through the personalized transportation information system 100 may be used to assist in transportation planning for one or a group of transportation vehicles prior to departure. Alternatively, a transportation plan may be obtained from the personalized transportation information system 100 while the vehicle is en route to a destination for the purposes of revising the route or transportation plan, altering future transportation plans, or for informational purposes. The relevant transportation plan may also be obtained, generated or altered based on achieving desired business objectives or goals or marketing strategies.

The personalized transportation information system 100 is described herein generally with reference to aviation, air transportation, the airline industry, airline travelers and/or airline pilots. However, those skilled in the art will recognize that the personalized transportation information system 100 is applicable to other forms of transportation including auto and marine transportation and drivers and navigators, and generally to any other form of transportation and/or traveler or operator.

FIG. 1 is a UML use-case diagram for the personalized transportation information system 100 and associated systems and actors according to one embodiment of the present invention. Referring to FIG. 1, the personalized transportation information system 100 comprises multiple software applications and databases and includes a transportation information engine 105. A traveler, navigator, operator, user or pilot 110 interacts with the transportation information engine 105 to receive a customized, weather-based, visualized transportation plan. The personalized transportation information system 100 may include and the transportation information engine 105 may interface with a personalization database 200, a geographical-navigational reference database 300, a weather data and prediction system 400 and an alert generation system 500. Each of these systems is described in greater detail below.

In one embodiment of the present invention, the traveler or user 110 interacts with the transportation information engine 105 through a monitor or keyboard (not shown) to obtain weather-based personalized travel information. Human-machine interfaces and display mechanisms are generally known in the art, and a description thereof is omitted herein for convenience only, and should not be considered limiting. A login or authorization feature 112 allows the traveler 110 to access the personalized transportation information system 100. The transportation information engine 105 may include an access personal information use case 114, such that upon login, personal information or profile(s) are accessed from a personalization database 200. As noted above the traveler or user 110 may be a traveler, navigator, operator, user, dispatcher, pilot or any other person or entity involved in planning or making decisions about a transportation plan or seeking information about a transportation plan. For example, the traveler or user 100 may be a representative commercial airline (e.g., a dispatcher or planner) or other transportation company or entity or may be the actual operator of the transportation vehicle in question (e.g., a pilot or truck driver). Those skilled in the art will recognize that the traveler or user 110 may be an entity or computer system or network designed to interact with the personalized transportation system 100.

Figure 2:
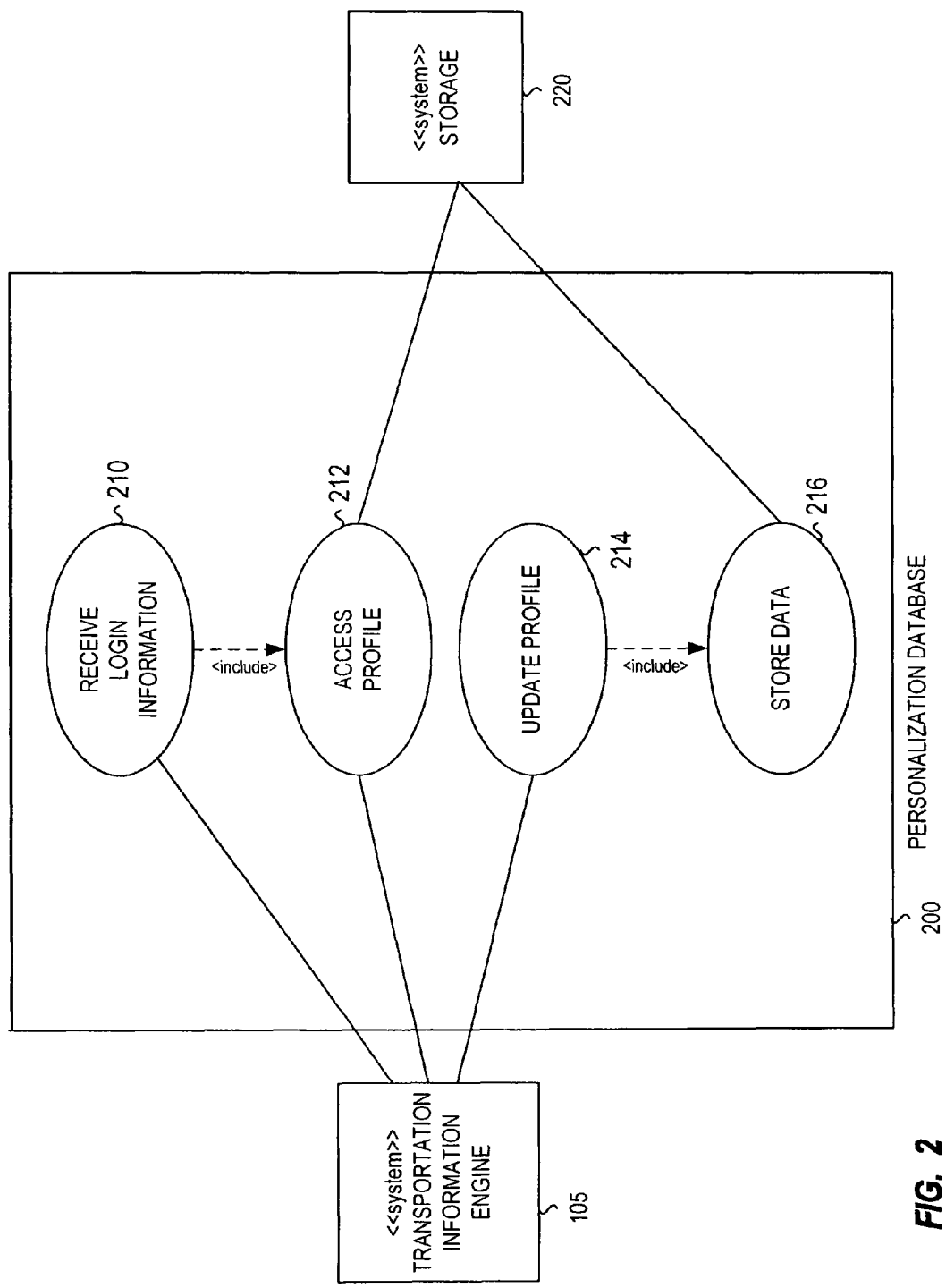
FIG. 2 is a UML diagram of the personalization database of the personalized transportation information system of FIG. 1.
Figure 3:
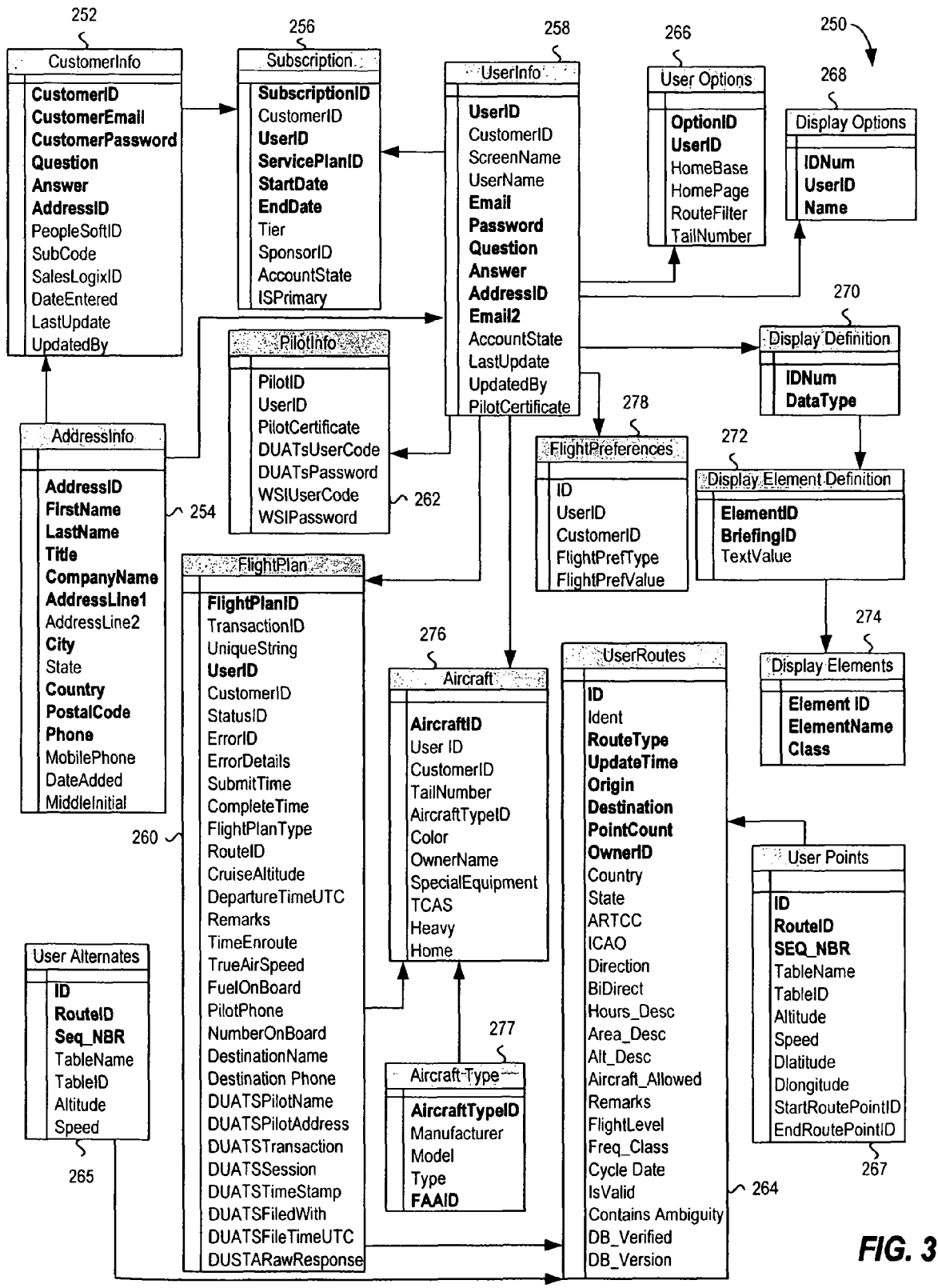
FIG. 3 is a representation of user profile tables in accordance with the personalization database of FIG. 2.

Referring to FIGS. 2 and 3, the personalization database 200 stores personalized information and preferences corresponding to the users (e.g., the traveler or pilot 110) or operators (e.g., a commercial airline or transportation company) of the personalized transportation information system 100. The personalization database 200 stores personal preferences of an individual user or pilot, such as the manner in which interface screens are configured and a pilot's individual preferences for flight routes. The personalization database 200 also stores preferences of an operator, such as preferred operating procedures and constraints of a pilot's airline, including business goals, objectives and preferences of the operator. Information is stored in the personalization database 200 in the form of a user profile 250 that includes numerous tables, each of which stores a type of information about a user (see FIG. 3). The user profile 250 is preferably stored in a read/write storage unit 220 that is generally known in the art. Upon receiving login information 210, the personalization database 200 utilizes an access profile feature 212 that retrieves from storage 220 the user profile 250 that is associated with the login information 210. The access profile feature 212 also returns the user profile 250 to the transportation information engine 105.

The user profile 250 preferably includes CustomerInfo and AddressInfo tables 252, 254 that store basic information about a particular user. The Subscription and UserInfo tables 256, 258 include information related to the user's subscription to the personalized transportation information system 100. The UserOptions table 266 includes information that the user may use to customize the "look and feel" of the user interface with personalized transportation information system 100. For example, the UserOptions table 266 includes fields for the HomeBase (i.e., the user's preferred or home airport) and RouteFilter, which enables the user to set a default type of route, as will be explained in greater detail below. The DisplayOptions, DisplayDefinition, DisplayElementDefinition and DisplayElements tables 268, 270, 272, 274, respectively, further define the customization and personalization of the user's interaction with the personalized transportation information system 100 and/or the transportation information engine 105.

The user profile 250 links all of the personalized information together through the use of various ID fields (e.g., "CustomerID", "UserID" "AddressID", etc.). The FlightPlan table 260 stores various attributes of a designated flight plan or route in the user profile 250. For example, the FlightPlan table 260 includes fields for altitude, airspeed, fuel, etc. Preferably, the flight plan table 260 stores multiple flight plans or routes, each identified by the "FlightPlanID" field. Thus, a user or operator of the personalized transportation information system 100 could store one or more known routes and some or all of the transportation information related to those routes within the user profile 250. Furthermore, the PilotInfo table 262 includes information that identifies a particular pilot or pilot's certificate within that particular user's profile (a user may hold more than one certificate). Therefore, since each user is able to store information for multiple pilots, a single user profile 250 may contain multiple flight plans (identified through the FlightPlan table 260) for each pilot of pilot's certificate identified by the PilotInfo table 262. In this manner, an operator such as a commercial airline could personalize the user profile 250 for each of its pilots while still maintaining consistency of customized company operating procedures for all pilots in the personalization database 200.

The user profile 250 further preferably includes a UserRoutes table 264 that includes one or more routes for a given location pair (i.e., departure and destination points) that are associated with and/or customized to the user profile 250. For example, if the traveler 110 desires to fly from Boston to Orlando, there are numerous different routes or flight paths that could be flown to actually reach Orlando. Which route is actually utilized depends on a variety of factors and parameters, including weather, air traffic, fuel, safety, business objectives, etc. Thus, the UserRoutes table 264 may include a listing of one or more of such routes for one or more city pairs. The routes that are included in the UserRoutes table 264 may be selected and stored by the user and/or pre-loaded by the personalized transportation information system 100, and may originate from multiple sources. In accordance with an embodiment of the present invention, the routes in the UserRoutes table 264 may be assigned to one or more classes. Examples of such classes include the following:

Preferred Routes—Routes that are published preferred as designated by the Federal Aviation Administration ("FAA");

User Routes—Routes that are determined, accepted, desired or otherwise characterized by a traveler 110;

Cleared Routes—Routes that have been previously cleared by the FAA or other applicable regulatory agency;

CDR—Coded Departure Routes that are published by the FAA or other applicable regulatory agency;

Re-Routes—Routes that are assigned by the FAA or applicable regulatory agency;

Corporate Route—Routes that are preferred by corporate users. Such routes may be a sub-set of User Routes, and/or be optimized for corporate interests, such as fuel; and Optimized Routes—Routes that have been optimized according to one or more categories, such as fuel, time, safety, etc.

Other route classes may also be designated according to a user or operator's preferences. Those skilled in the art will understand that a route for a particular location pair may be assigned to one or more classes. Furthermore, the user routes could be stored all together in the UserRoutes table 264 or be stored in individual tables corresponding to the particular route classification. The UserRoutes table 264 may refer to UserAlternates and UserPoints tables 265, 267 in obtaining information relevant to the stored routes for a particular location pair.

The user profile 250 may also include an Aircraft and AircraftType tables 276, 277 that include data, such as size, fuel consumption, type, etc., related to one or more specific aircraft that the user may utilize. Additionally, a FlightPreference table 278 allows the user to store information related to general route or flight characteristics and tolerances, such as preferred types of routes, length, time, turbulence, etc. The user profile 250 may include other tables not specifically noted herein that would allow related personalized information about a user or traveler to be stored by the personalized transportation information system 100, without departing from the spirit and scope of the embodiments of the present invention. Those skilled in the art will also understand that some of the foregoing tables identified as part of the user profile 250 will be different depending on the type of transportation involved in the personalized transportation information system 100, and further that the similar tables may be employed but include information that corresponds to the particular type of travel. For example, if the desired travel information relates to automotive travel, then the user profile 250 would include tables corresponding to automotive and traffic features instead of the airline industry. For example, the FlightPlan table 260 would include data fields related automotive travel and not air travel (i.e., altitude would not be necessary), and the Aircraft and AircraftType tables 276, 277 would include data relevant to automobiles instead of aircraft.

Figure 4:
FIG. 4 is an example of a user interface in accordance with the personalization database of FIG. 2.
Figure 5:
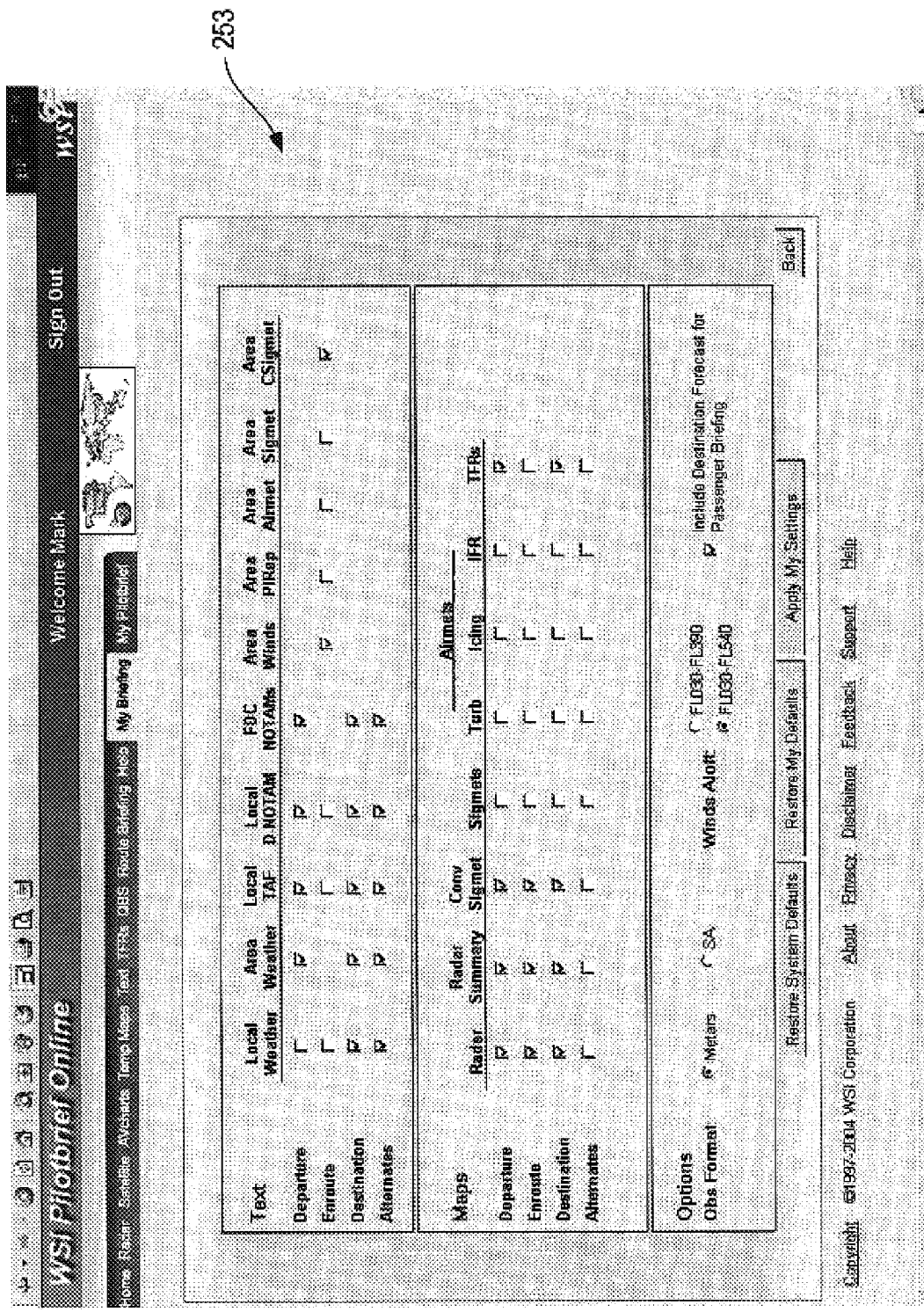
FIG. 5 is an example of a user interface in accordance with the personalization database of FIG. 2.

The personalization database 200 further includes an update profile feature 214 that allows the traveler 110 to update the user profile 250 with changes or additional personalized information supplied by the traveler 110. The personalization database 200 records the updated profile 250 by storing data 216 in the storage unit 220. For example, the traveler 110 may view and/or update his personal information that is stored in the CustomerInfo, AddressInfo, Subscription and UserInfo tables 252, 254, 256, 258, among others. FIG. 4 shows an example of a traveler interface screen 251 through which the traveler 110 may enter or change information to update the user profile 250. FIG. 5 shows another user preference selection screen 253 through which the traveler 110 may set default items of information for text and map displays related to generated route information, discussed in greater detail below. Selecting default display conditions as shown in FIG. 5 does not preclude the traveler 110 from viewing the unselected features in the actual display, but rather allows the personalized transportation information system 100 to provide the traveler 110 with an initially customized display of travel information. It is understood that the type and manner of interface preference selection screen(s) displayed to the traveler 110 will vary according to the type of transportation for which information is sought.

In one embodiment, operational parameters are received by the transportation information engine 105 of the personalized transportation information system 100 via a receive operational parameters use case 116. Operational parameters may be directly input by the traveler or user 110 or may be retrieved from the personalization database 200 and/or the geographical-navigational reference database 300 and/or any other database(s) or system associated with the personalized transportation system 100. In general, operational parameters include any non-weather related parameters relevant or corresponding to the type of transportation for which travel information or a transportation plan is sought. Thus, operational parameters may include vehicle transportation characteristics for air, ground, and water based vehicles. Such parameters include, but are not limited to, vehicle type, make, and model, performance characteristics, fuel efficiency, passenger capacity, sensitivity to certain types of weather, or any other parameter that characterizes a vehicle. Operational parameters may also include transportation environment characteristics. For example, for air travel, operational parameters might include airport or runway configuration, airport acceptance rate (AAR), airport departure rate (ADR), air traffic congestion, airspace restrictions, etc. For automotive travel, such operational parameters include, but are not limited to, traffic congestion and delays, road construction, road closures, or accidents. The operational parameters may also include information such as accepted flight plans, manifest data (e.g., cargo, passengers and crew), costs related to particular routes or aircraft, fuel prices, landing fees or overflight charges, harbor fees, business goals or objectives, starting locations, ending locations, intermediate locations, alternate locations, etc.

Although the operational parameters are generally non-weather parameters or criteria, the operational parameters may be weather dependent. For example, the utilization of runways for a particular configuration at an airport may be determined based on the prevailing winds. In another example, the AAR may decrease or be lower during a disruptive weather event, such as a thunderstorm or winter storm.

In one embodiment, upon login to the personalized transportation information system 100, the transportation information engine 105 receives operational parameters that include at least a desired location pair, or start and end points, of the travel for which personalized information is sought. As previously noted, the receive operational parameters use case 116 may receive the various operational parameters by direct input from the traveler or user 110 or receive the information from the personalization database 200 and/or the geographical-navigational reference database 300.

Figure 6:
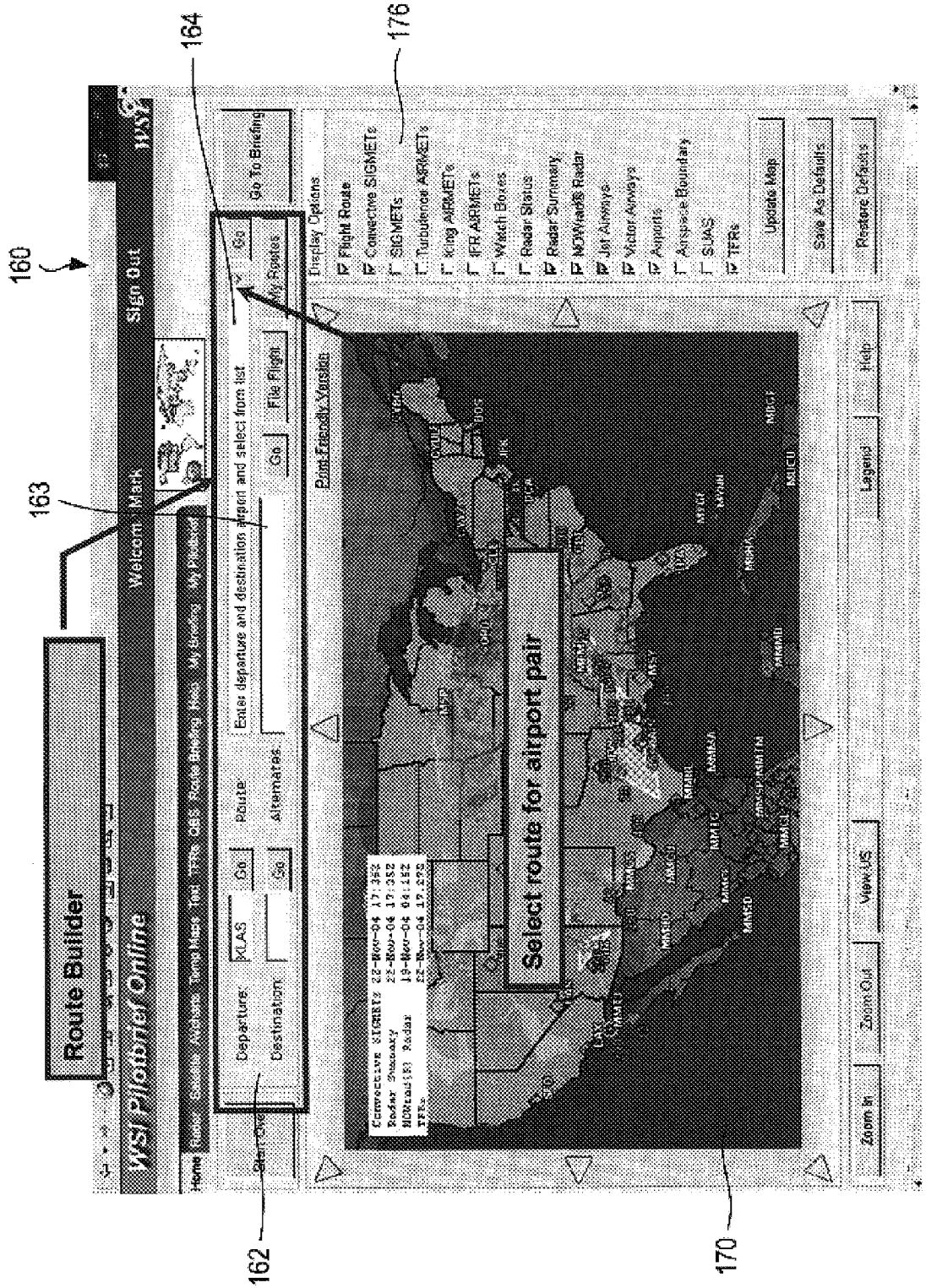
FIG. 6 is an example of a user interface in accordance with the personalized transportation information system of FIG. 1.

In the case of air travel, for example, the location pair may be in the form of the three-character airport code (e.g., MCO for Orlando International Airport), four-character airport code or actual city names. FIG. 6 shows an example of a traveler interface screen 160 in accordance with an embodiment of the present invention that includes location pair entry fields 162. The interface screen 160 may be presented for interaction with the traveler or user 110 on a display/monitor system 115. Those skilled in the art will recognize that the location pair may be identified by any manner of identifying geographic origin and destination points, including city names, navigational markers, landmarks and/or latitude and longitude. In one embodiment, the location pair is entered or selected directly from the interface screen 160 by pointing and clicking on a location on a map display and/or selecting one or more locations from a list, such as a pull-down menu. The location pair is similarly entered for other types of travel. The traveler 110 may also be presented with an option to enter one or more other operational parameters, such as alternate destination points 163 for which corresponding routes may also be generated. An alternate destination point may be entered in the case that the destination point for the entered location pair is not reachable or simply to provide the traveler 110 with a secondary list of available routes leading to the same region. The traveler 110 may also be presented with an option to enter one or more intermediate location points which are locations that the transportation route must pass through between the staring point and the ending point.

In one embodiment, the traveler interface screen 160 includes a map viewer 170 depicting a geographically accurate color-coded map of a default area on which may be displayed certain features of interest to the traveler, including weather (e.g., radar, satellite images), air traffic, airports, areas of concern, restricted airspace, alerts and other types of operational parameters or information that may be desired by the traveler 110 prior to or during travel. The map viewer 170 preferably includes a display options panel 176 through which the traveler 110 may select different features for display, as discussed in greater detail below. It is understood that the type and manner of traveler interface screen(s) will vary according to the type of transportation for which information is sought.

To provide more accurate and detailed personalized travel information, the operational parameters received by the operational parameters use case 116 may include the desired departure and/or arrival time (or a time range) entered by the traveler 110 (or from another source) in addition to the location pair. That is, since the personalized transportation information system 100 provides weather and/or traffic-based travel information, it may be desirable to know the traveler's proposed departure or arrival time so that accurate weather predictions, airspace events and other relevant factors are considered when generating the travel information for each en route segment. Additionally, other operational parameters, such as the type of equipment (i.e., aircraft type) may be entered by the traveler 110, since such information also affects the weather-based travel information provided by the personalized transportation information system 100.

Figure 7:
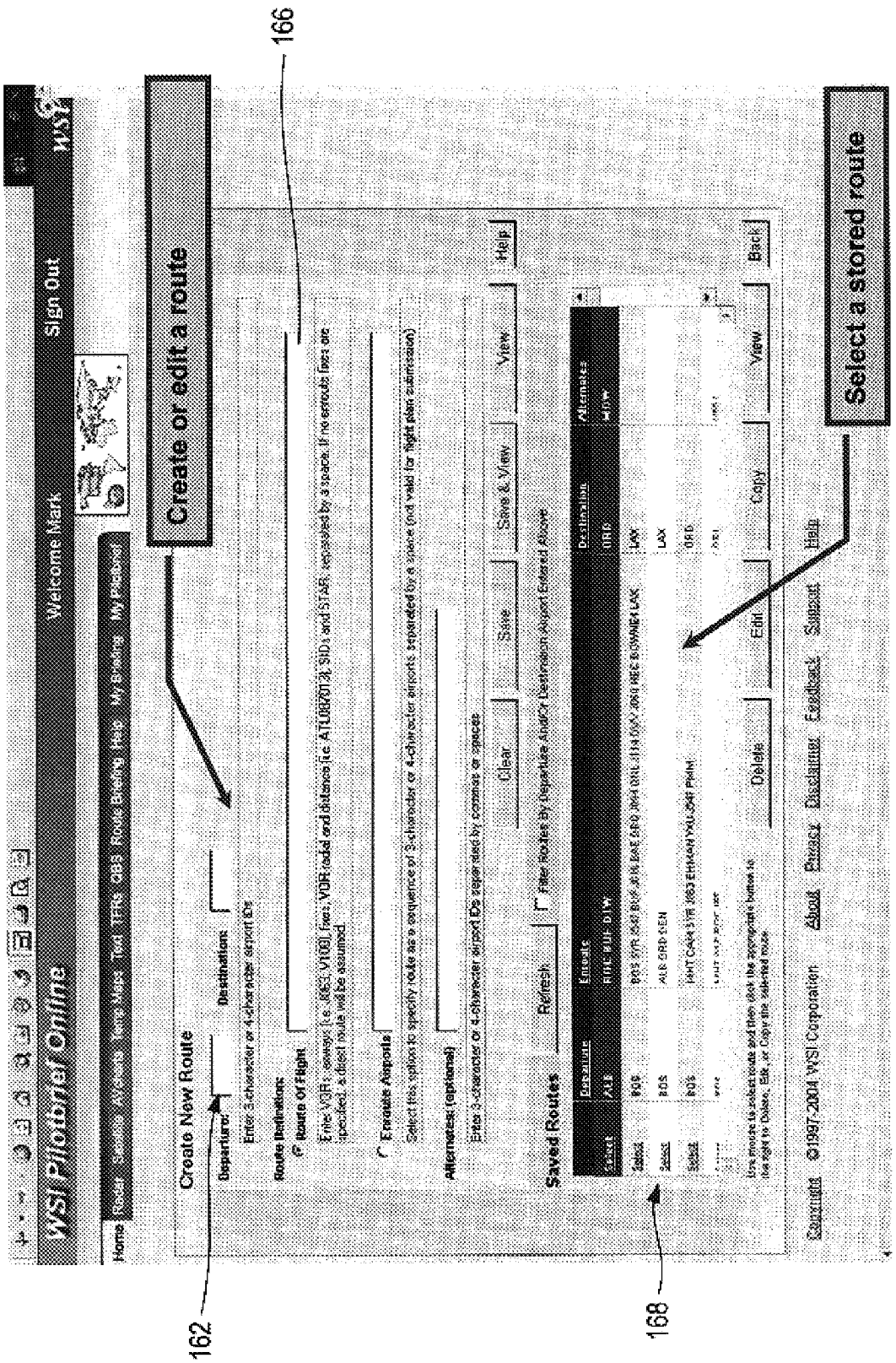
FIG. 7 is an example of a user interface in accordance with the personalized transportation information system of FIG. 1.

The personalized transportation information system 100 includes a propose routes feature 118 in which routes corresponding to the location pair or other operational parameters entered by the traveler 110 are presented to the traveler 110. In one embodiment, the personalization database 200, based on the operational parameters received by the receive operational parameters use case 116, retrieves routes stored in the UserRoutes table 264 of the user profile 250. The traveler 110 is thus presented with a route list 164 corresponding to the location pair that was entered (see FIG. 6). The route list 164 may thus include one or more classes of routes as previously discussed. Referring to FIG. 7, the traveler 110 may also create a new route by entering a location pair and manually entering the route of the flight 166. New routes may then be stored as part of the user profile 250. The traveler 110 may also view, sort and/or select routes from a list of saved routes 168. The saved route list 168 may display all of the routes stored in the UserRoutes table 264 regardless of the entered location pair, or only a subset thereof. The saved routes list 168 may be sorted or filtered according to criteria such as departure or destination location, actual route flown or alternate destination. Additionally, the traveler 110 may edit an existing route by selecting a route from the route list 164 or the saved route list 168 and changing portions of the selected route. Such route changes may also be stored in the user profile 250.

Figure 8:
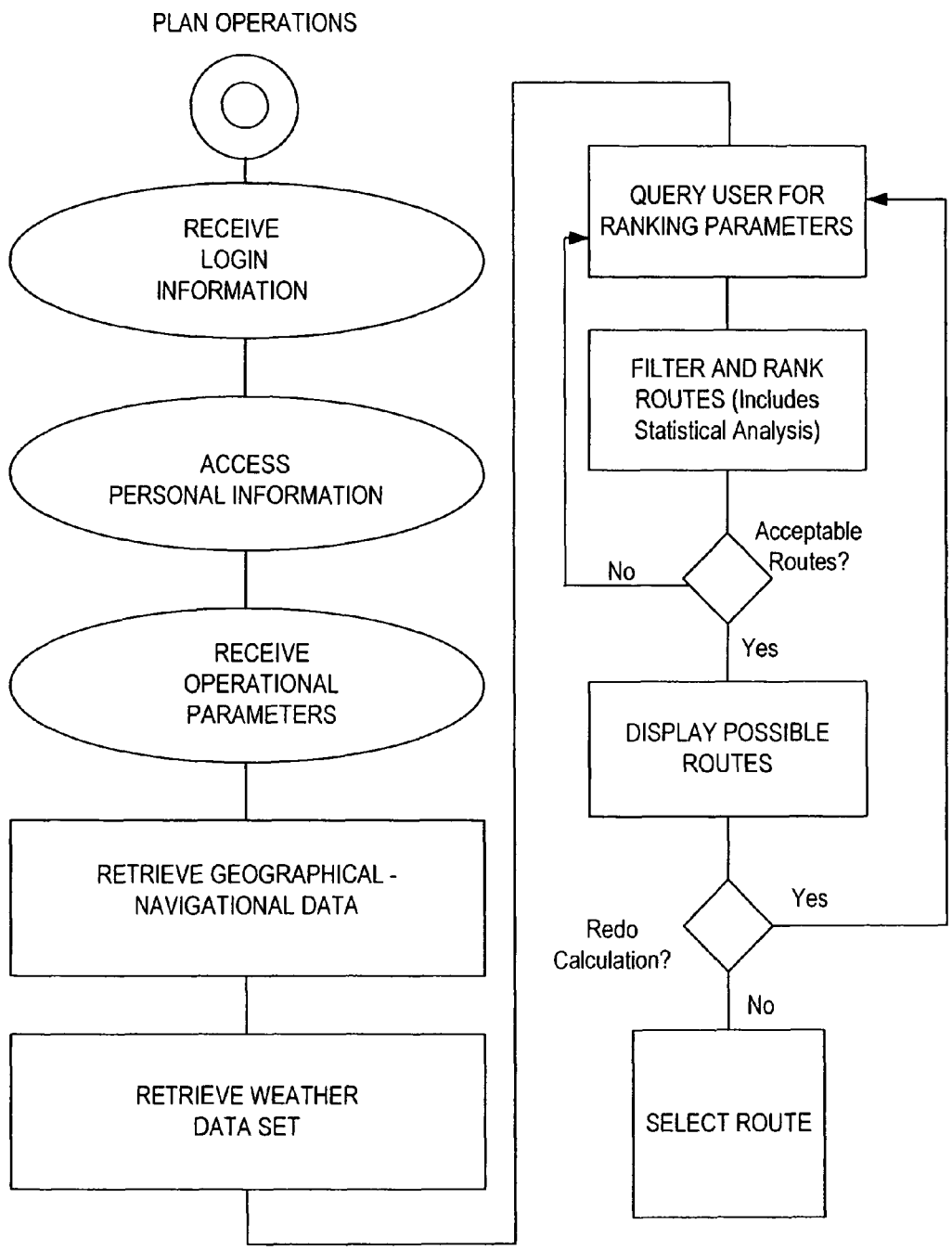
FIG. 8 is a flow diagram of the plan operations feature of the personalized transportation information system of FIG. 1.

Referring to FIGS. 8-13, in one embodiment, the propose routes feature 118 of the personalized transportation information system 100 suggests routes and/or transportation plans to the traveler 110 as determined by a plan operations feature 140. The plan operations feature 140 determines and ranks available routes based on preferences stored in the user profile 250, current operational parameters and current and forecast weather data. FIG. 8 summarizes one implementation of the process through which the plan operations feature 140 proposes routes to the traveler 110. After the traveler 110 has logged on and entered a location pair, the traveler 110 may be requested to enter additional operational parameters of information, such as type of aircraft and departure time. The plan operations feature 140 accesses the user profile 250 from the personalization database 200 (through the access personal information feature 114) so that the traveler's preferences and tolerances may be considered when suggesting a route. The user profile 250 provides the plan operations feature 140 with criteria that the traveler 110 prefers to use when planning and selecting a route. The plan operations feature 140 also obtains operational parameters (i.e., as received through the receive operational parameters use case 116) as well as references operational parameters and other information stored in the geographical-navigational reference database 300.

Figure 9:
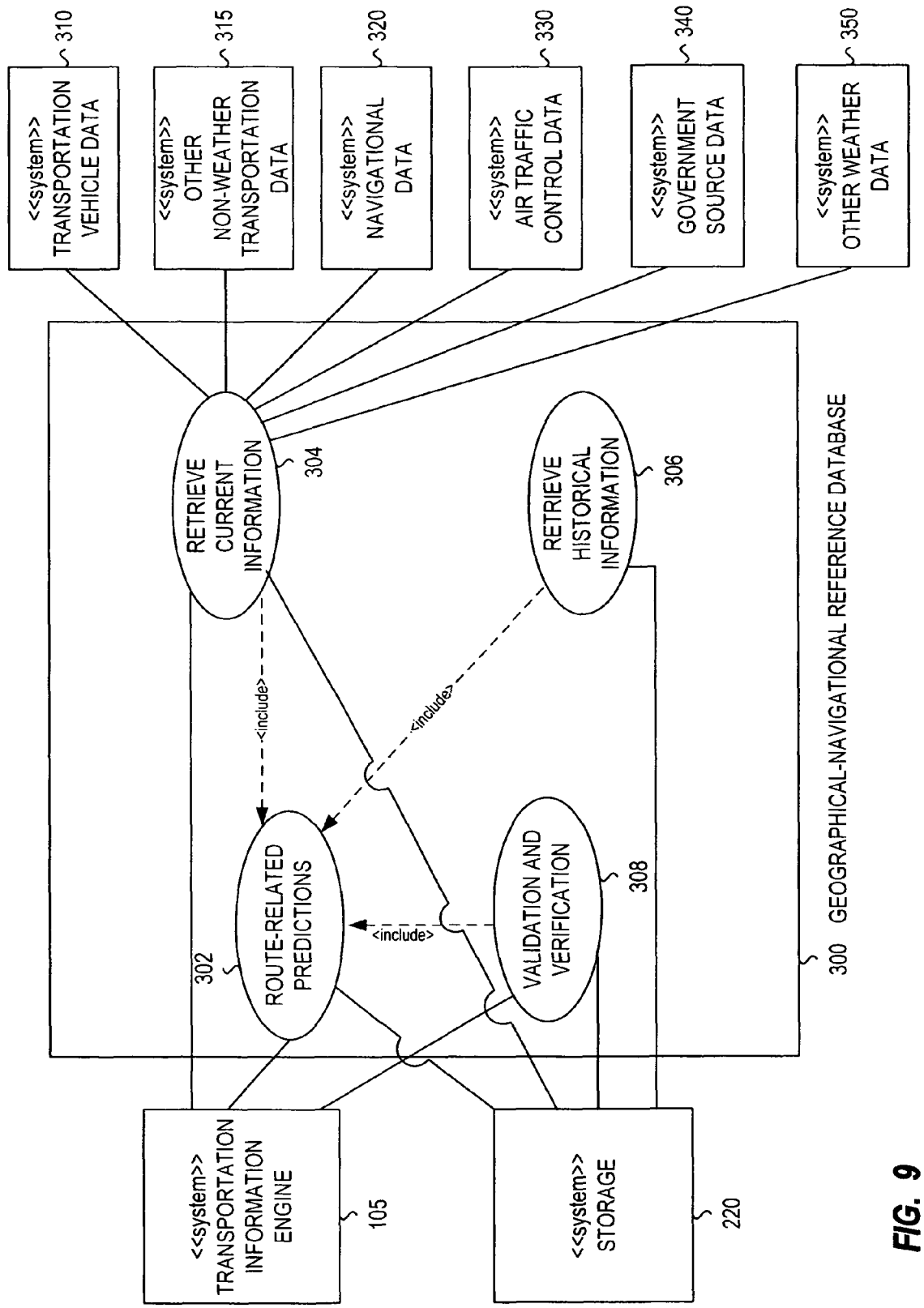
FIG. 9 is a UML diagram of the geographical-navigational database of the personalized transportation information system of FIG. 1.

FIG. 9 is a UML diagram of the geographical-navigational reference database 300, which includes a route-related predictions feature 302 for output to the transportation information engine 105 of the personalized transportation information system 100. The route-related predictions feature 302 generates non-weather predictions about travel between the entered location pair. The route-related predictions 302 are based on current and/or historical information features 304, 306. Examples of route-related predictions 302 include predictions or analysis of whether a route between the entered location pair will have an air traffic delay or the probability of whether one or more of the routes for that location pair will be approved (i.e., cleared) for flight. Factors affecting the route-related predictions 302 include, for example, volume of air traffic desiring or utilizing that route, airport configurations associated with that route, flight restrictions along or near that route, and knowledge of a special event occurring along that route.

The historical information feature 306 (retrieved from the storage unit 220) retrieves historical route data, aircraft traffic data, and any other previously collected data related to route prediction. One or more categories of these data may be utilized by the route-related predictions feature 302. The geographical-navigational reference database 300 may also include a validation and verification feature 308 that compares route predictions with actual, observed route data, and/or with stored information in the storage unit 220 for analysis with historical information in making future route predictions. Stated differently, the geographical-navigational reference database 300 considers historical data, predictive data and the accuracy of historical predictive data when generating route-related predictions 302 for output to the plan operations feature 140.

Figure 10:
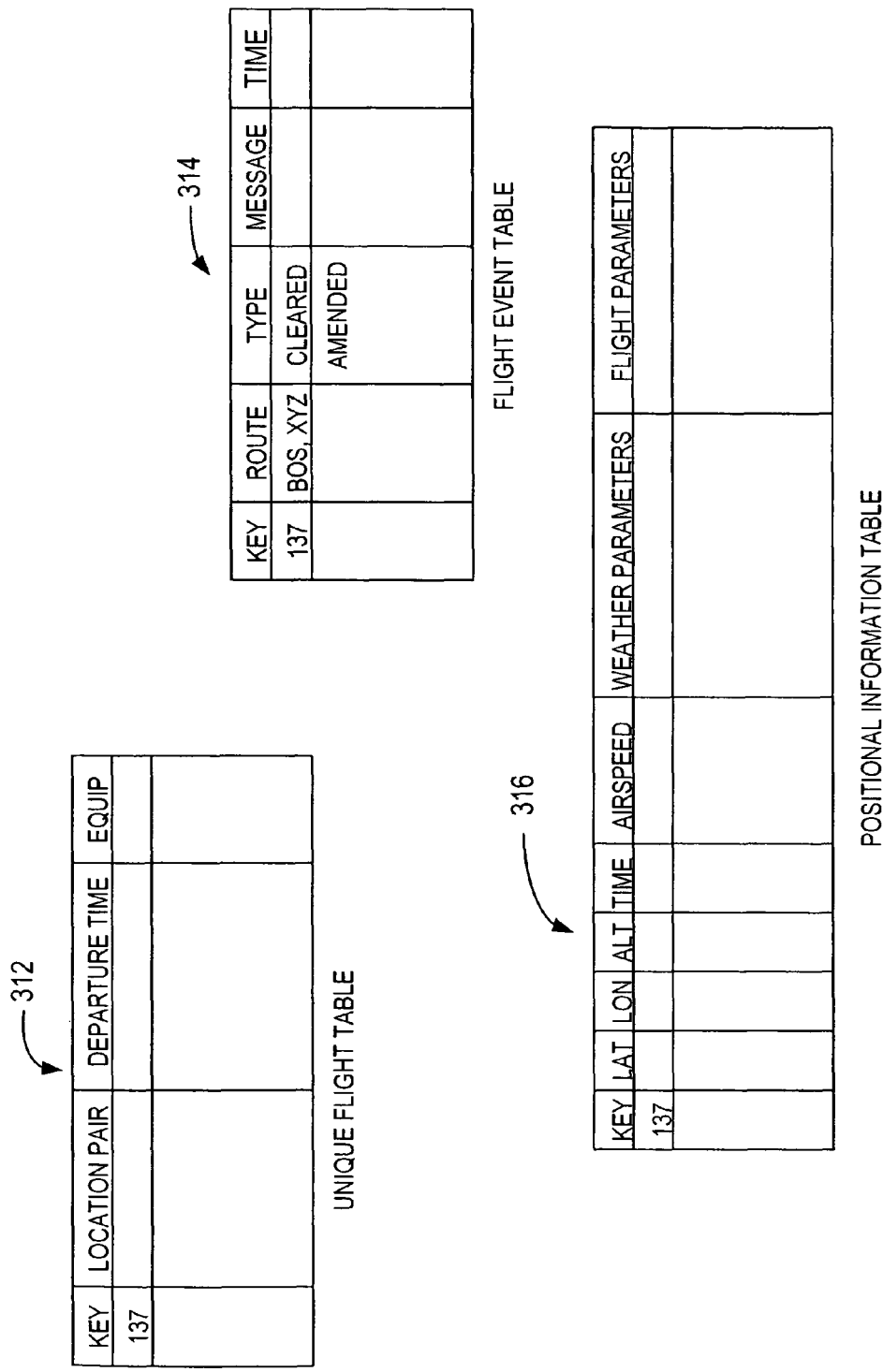
FIG. 10 is an example of operational parameters tables in accordance with the geographical-navigational database of FIG. 9.
Figure 11:
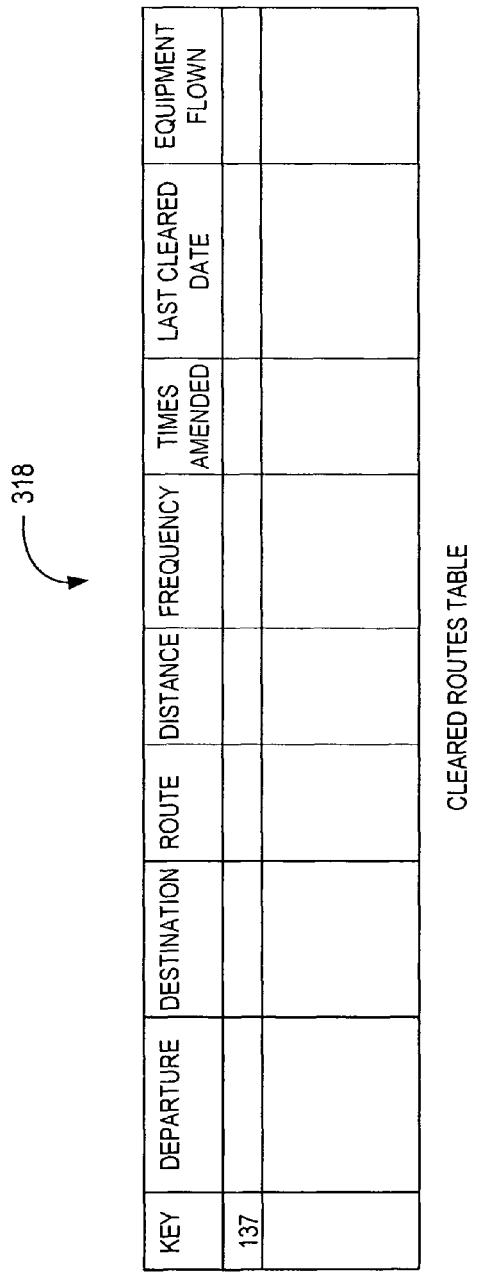
FIG. 11 is an example of an operational parameters table in accordance with the geographical-navigational database of FIG. 9.

The geographical-navigational reference database 300 also retrieves current information 304 for generation of the route-related predictions 302, output to the plan operations feature 140 and output to the storage unit 220 for future analysis. The current information obtains transportation and other data that generally defines the non-weather environment in which the traveler 110 will travel or navigate, and any other general operating criteria related to the transportation for which travel information is sought. Thus, operational parameters obtained through the geographical-navigational reference database 300 may include transportation vehicle data 310, such as aircraft type, make, and model, aircraft performance characteristics, as well as sensitivity to certain types of weather. For example, if a particular type of aircraft is especially sensitive to lightning, an appropriate indication would be made in the transportation vehicle data 310 provided to the receive operational parameters use case 116 and/or the plan operations use case 140 by the geographical-navigational reference database 300. Referring to FIGS. 10 and 11, the geographical-navigational reference database 300 further includes several tables to organize various aspects of the current information obtained through the retrieve current information use case 304. In the present example of air travel, a unique flight table 312 preferably includes the basic information input to the personalized transportation information system 100 by the traveler 110: location pair, departure time and flight equipment. Through the unique flight table 312, each entry is assigned a specific "key" with which the entry may be tracked with respect to other operational parameters.

A flight event table 314 includes data related to whether a route has been assigned to the entered location pair, and whether such route has been submitted, cleared, amended, denied, etc. The flight event table 314 also records the time at which the flight event occurred. A flight position table 316 records actual, observable positional and environmental flight information for the corresponding location pair, including current position (latitude and longitude), time, altitude, airspeed, weather parameters, and flight parameters. The flight information may be obtained from aircraft sensors (e.g., "on-board weather"), including Aircraft Communications and Reporting System ("ACARS"), Tropospheric Airborne Meteorological Data Report ("TAMDAR"), satellite communications ("SATCOM") systems, and other such system that are generally known in the art. A cleared routes table 318 includes the route, distance, frequency that the route is used, the number of times that route has been amended, the date on which that route was last cleared for flight and the equipment used on that route.

The current information obtained through the retrieve current information use case 304 may also include other non-weather transportation data 315 such as manifest data (cargo, passengers and crew), costs related to particular routes or aircraft, fuel prices, landing fees or over-flight charges.

The flight tables 312, 314, 316, 318 provide a comprehensive history for a particular route, both for purposes of suggesting and selecting future routes and amending or assessing routes currently underway. That is, the information contained in the flight tables 312, 314, 316, 318 helps generate the route-related predictions 302, but is also input directly to the operation planning engine 140 to directly influence the suggested routes provided to the traveler 110. The geographical-navigational reference database 300 may include other and/or different tables to organize the current information (e.g., the transportation vehicle information 310, non-weather transportation data 315, etc.), depending on the relevant type of transportation.

The current information retrieved by the geographical-navigational reference database 300 also preferably includes navigational data 320 related to the type of transportation. In the present air travel example, navigational data 320 generally defines flight paths and navigational parameters of the national airspace. Examples include route structures, routes, permanent or temporary flight or air space restrictions, special use airspace, re-routes and other relevant airspace Notices to Airmen ("NOTAMs"). Navigational data 320 also preferably includes information about navigational aides and references points (e.g., location and type). Additionally, geopolitical data, such as international airspace, international flight routes or other geographic based parameters that are politically defined may also be included in the navigational data 320. For automotive transportation, navigational data 320 may include, for example, one or more map or road systems as well as restricted or limited access roads, etc.

The current information retrieved by the geographical-navigational reference database 300 also includes air traffic control ("ATC") data 330. ATC data 330 includes data related to current aircraft operations as officially known to or reported by the FAA. Thus, ATC data 330 includes current aircraft positional information, airport arrival rates, aircraft acceptance rates, airport departure rates, airport runway configurations, air traffic control programs in place (e.g., closures, ground-stops, ground delays, etc.) and airport or facility NOTAMs. The ATC data 330 is not limited to data related to the entered location pair or a selected route. Rather, the ATC data 330 may include data for some or all of the aircraft, airports and routes known to the FAA at the time the ATC data 330 is requested. For example, the aircraft positional information may include all airborne aircraft known to the FAA when the ATC data 330 is requested. Thus, any aircraft positional obtained from the ATC data 330 may be in addition to and different from the positional information contained in the flight position table 316. The ATC data 330 also may include aspects that impact flight restrictions or constrained airspace, such as capacity and demand on a particular route or region. Those skilled in the art will recognize that if the personalized transportation information system 100 is utilized outside of the United States, then the ATC data 330 would be obtained from a source(s) other then the FAA, such as the appropriate governmental (or commercial) entity responsible for monitoring or providing such data.

The current information retrieved by the geographical-navigational reference database 300 further includes government source data 340. Government source data is publicly available data (i.e., not supplied by the personalized transportation information system 100 or the traveler 110) related to air travel, such as weather alerts and advisories issued by the National Weather Service. Examples of government source data 340 include Significant Meteorological Information ("SIGMETs"), Convective SIGMETs and Airman's Meteorological Information ("AIRMETS"). Since these weather alerts and advisories are generally known to those skilled in the art, and therefore, a description thereof is omitted here for convenience only, and should not be considered limiting.

In an alternative embodiment, the retrieve current information feature 304 may also receive other weather data 350 that is similar to the government source data 340, but which is supplied by an independent, private system or organization. For example, the other weather data 350 may include SIGMETs and Flight Plan Guidance that are generated independently of the government source data 340, and which, by their nature, have different parameters or criteria than the corresponding data in the government source data 340. The other weather data 350 may be proprietary to the personalized transportation information system 100 or be simply from a private third-party, such that the weather data 350 is not publicly available.

The retrieve current information feature 304 need not receive all of the types of information from all of the sources described above for the route-related predictions feature 302 to operate or for the plan operations feature 140 to suggest routes to the traveler 110. Rather, some of the data included in the current information may not be available depending on the sources available to the personalized transportation information system 100 at any given time, or depending on other factors. However, those skilled in the art will understand that the more data, including current information, that the system has available, the greater ability for the personalized transportation information system 100 to formulate more complete and precise route or transportation plan suggestions. Moreover, the retrieve current information feature 304 may receive different types of data than that described above, depending on the type of transportation. For example, if the personalized transportation information system 100 is generating information related to marine travel, the current information would not include ATC data 330, but may, instead, include Coast Guard data.

In addition to receiving operational parameters and/or current information from the geographical-navigational reference database 300, the plan operations feature 140 receives a weather data set from the weather data and prediction database 400. The weather data set includes weather data for both the departure and destination locations and regions, as well as weather data for areas in between or along the general route of the entered location pair. The weather data set includes current weather data, including satellite imagery, Doppler radar, terrestrial weather information, storm data, temperatures, winds aloft, etc., and any other current weather data that may be of interest in planning a flight route. The current weather data may be gathered from one or more sources, and may be reported to the plan operations feature 140 as multiple current weather data sets. The predictive weather data supplied by the weather data and prediction database 400 includes similar information, but by definition is predictive in nature of future weather conditions, events or data. The predictive weather data may include the translation of forecast weather conditions into forecast traffic flow conditions using methods that are proprietary to the personalized transportation information system. The predictive weather data is obtained in any manner, including methods generally known to those skilled in the art of weather prediction. A detailed description of collecting and predicting weather and related events is omitted here for convenience only and should not be considered limiting. The predictive weather data may be supplied by a single source or may be obtained from multiple sources. Moreover, the predictive weather data may include diverging predictions in some embodiments.

Figure 12:
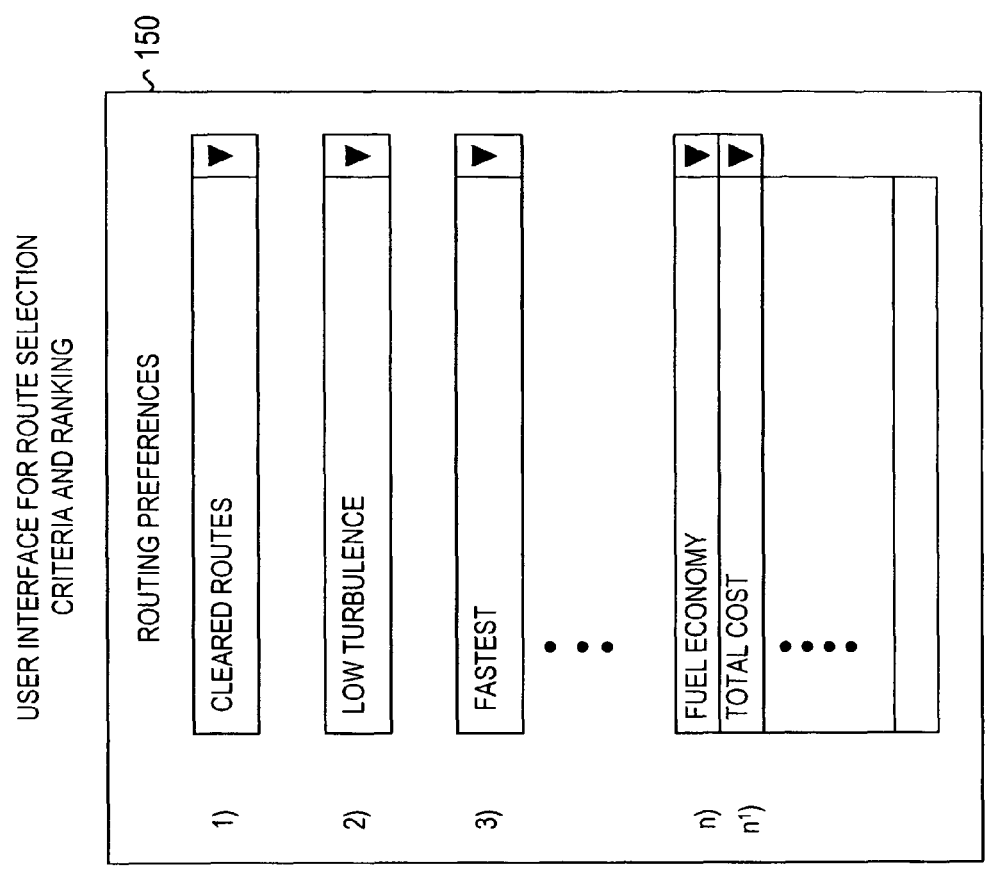
FIG. 12 is an example of a user interface in accordance with the plan operations feature of FIG. 8.

After the plan operations feature 140 receives the relevant data related to the entered location pair, including the weather data set and the operational parameters, the personalized transportation information system 100 may query the traveler or user 110 to determine how the plan operations feature 140 should analyze and synthesize the retrieved data to suggest routes to the traveler 110. Accordingly, the traveler 110 may be presented with a list of ranking parameters or preferences that instruct the plan operations feature 140 how to suggest or list the possible routes applicable to the entered location pair. The traveler 110 may choose multiple ranking preferences, such that the available routes are weighted according to multiple factors, and be presented with a ranked list and/or ranking interface screen 150 (see FIG. 12). For example, in FIG. 12 the traveler 110 may be most interested in routes that have been cleared, while routes that are fastest or having low fuel economy are of lesser importance. Therefore, the operation planning engine 140 will rank routes, such that if a route has been cleared, it receives a relatively high weight factor compared to other available routes that have not been cleared. In FIG. 12, routes that have relatively low turbulence would also receive a weighting factor, but one which is lower than the weighting factor applied to cleared routes. In many cases, operator (i.e., a commercial airline) policy or business objectives or goals may restrict flight into an area of severe turbulence. Accordingly, such criteria would obviously have a higher weighting factor than, for example, cleared routes. Another example considers current aircraft equipment configuration which may be prohibited by government regulation(s) from flying through areas of particular weather (e.g., icing). The routes may be ranked based on various criteria, including:

cleared routes;
route duration (i.e., speed);
route length (i.e., distance);
operator policy or business objectives (i.e., avoidance of severe turbulence);

government regulations (i.e., Minimum Equipment Lists);
low turbulence;
fuel economy;
total route cost; and
safety.

In one embodiment, the plan operations feature 140 presents a default order of ranking parameters based on preferred conditions set in the user profile 250. The traveler 110 then has the opportunity to re-select or verify the preferred order. Alternatively, the plan operations feature 140 could be configured to simply rank the available routes based on pre-set default conditions without any input from the traveler 110.

Assuming that there are routes available between the entered location pair, the plan operations feature 140 analyzes and synthesizes the information received from the personalization database 200, the geographical-navigational database 300 and the weather database 400 to generate a list of potential routes between the location pair entered by the traveler 110. The plan operations feature 140 then ranks the available routes (according to the preferences set by the traveler 110) based on criteria including:
  current weather conditions;
  current airspace conditions;
  predicted weather conditions;
  external criteria or filters (e.g., business objectives, aircraft availability or crew scheduling);
  other current operational parameters;
  user profile; and
  projected airspace conditions (including weather events).

In one embodiment, the plan operations feature 140 includes a statistical and/or historical analysis of relevant factors when ranking the available routes. In particular, statistical analysis is preferably used to determine or predict a future change in playbook (e.g., departure routes, approach, runway configuration, etc.) based on current conditions and/or current predictions. Stated differently, the plan operations feature 140 considers a statistically significant sample of what occurs in response to certain events locally or nationally in order to generate an appropriate ranking for the entered location pair. Such a statistical analysis could include the following:
  flow analysis of demand and capacity at the departure or destination airport(s) or other airports in the region;
  predicted traffic flow at arrival and departure points;
  historical delay generally at arrival and departure airports in view of the projected weather conditions;
  historical impact of changing a flight plan (e.g., cost analysis), such that a comparison is made between, for example, routes flown and routes cleared;
  analysis of airport acceptance and departure rate(s);
  route frequency flown by specific classes of equipment;
  the frequency a particular route is flown when certain weather is predicted for that route;
  historical and projected routing options (i.e., re-routes) and delays associated therewith;
  projected change in runway, departure and/or arrival configurations;
  projected change in operational traffic flow;
  ensemble considerations based on re-routing;
  traffic spill-over impacts; and
  flow-constrained airspace restrictions.

The statistical analysis may be applied directly to the route ranking, such that the listed routes are also weighted based on the statistical results. Alternatively, the statistical results may be presented to the traveler 100 as additional information regarding the route selection. That is, the plan operations feature 140 may present a ranked list of routes, filtered according to the input criteria, along with some form of visual statistical indication about one or more of the route listings as obtained from the performed statistical analysis.

In one embodiment, the plan operations feature 140 does not exclude any potential route or flight path for any reason. The routes generated by the plan operations feature 140 may or may not be listed in the UserRoutes table 264 in the user profile 250. In the event that there are no acceptable routes to present to the traveler 110, the plan operations feature 140 will request that the traveler either re-select the ranking preferences and/or enter a different location pair (see FIG. 8).

Once the plan operations feature 140 has generated and ranked the routes, the propose routes feature 118 presents the traveler 110 with the ranked list on the display 115. The routes may be presented to the traveler 110 in a graphical format, text format (such as a list) or a combination of both. In one embodiment, the propose routes feature 118 may also propose one or more flight routes that include operational or business information (such as flight speed, projected fuel consumption or "business executive/VIP on board") in addition to the basic route information. The graphical display may show the proposed routes on a geographically accurate map and may include a summary visualization of events along the ranked routes. Through the select routes feature 122, the traveler 110 is able to select one or more of the routes to obtain additional weather, operational, business or other information, such as flight time or fuel consumption, about that particular route. Those skilled in the art will recognize that the propose routes feature 118 could propose routes or transportation plans (or changes thereto) to the traveler 110 prior to departure or after departure, while the traveler 110 is en route. The route suggestions or alterations may be proposed to the traveler 110 in real-time, near real-time or with a delay, depending on the availability and status of the data obtained by the plan operations feature 140 from the relevant databases.

In one embodiment, the personalized transportation information system 100 permits higher-level transportation decisions to be made that account for a multitude of transportation plans or routes for numerous different transportation vehicles. For example, a commercial airline dispatcher or planner may want to determine which flights are the highest priority out of a certain group of flights based on a number of different criteria, including, for example, business objectives and weather data. That is, for example, if a dispatcher is notified that there is a limited window of time to land inbound flights to a particular airport (e.g., because that airport will soon institute a ground stop), the personalized transportation information system 100, using the route ranking process described above, provides the dispatcher with a prioritized list of the flights that the dispatcher should attempt to land first based on the relevant applicable business criteria.

Figure 13:
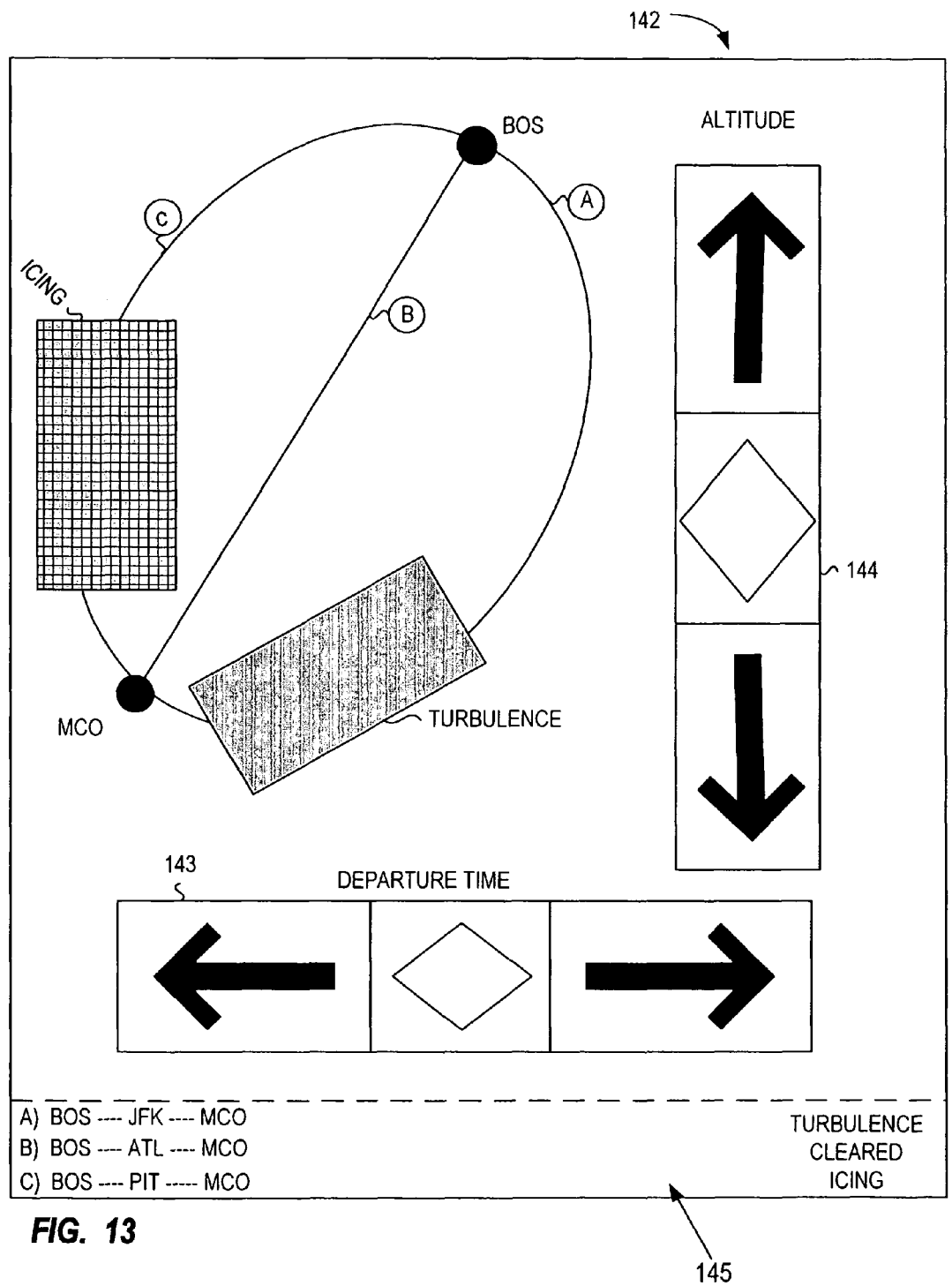
FIG. 13 is a first example of suggested routes in accordance with the plan operations feature of FIG. 8.

Referring to FIG. 13, one or more of the routes proposed by the plan operations feature 140 may be displayed in a graphical or semi-graphical manner so that the traveler 110 may visually identify features of the route(s). For example, in FIG. 13, three routes have been presented from Boston to Orlando, A, B and C. The route display 142 indicates that routes A and C pass thorough areas that have active or projected SIGMETS, turbulence and icing, respectively. There do not appear to be any restrictions or events identified for route B. In FIG. 13, the routes generated by the plan operations feature 140 are also displayed in a text or list format 145, along with corresponding characteristics of the different routes or flight plans.

In one embodiment, the propose routes feature 118 allows the traveler 110 to adjust the departure time and/or altitude of the proposed flight plan. For example, in FIG. 13, the departure time adjuster 143 and altitude adjuster 144 permit the traveler 110 to visually alter these parameters. In doing so, the plan operations feature 140 re-calculates the routes A, B and C and determines if the time and/or altitude adjustment(s) entered by the traveler 110 also have an effect on the proposed routes or flight plans. For example, the icing SIGMET identified in route C is likely based on the projected time at which the aircraft would reach that region of route C. However, if the departure time from Boston is changed (either later or earlier) it is possible that the icing SIGMET for route C no longer exists and is therefore not a concern. Such a flight plan adjustment may be valuable, since route C may be the most cost effective route to fly on the basis of time or fuel. Alternatively, the traveler 110 may realize that flights departing Boston historically incur a delay, and that, route C may be selected because the actual departure time will be later than desired anyway. Moreover, adjusting the departure time and/or altitude may completely alter the suggested route list in that additional or different routes may now qualify (i.e., added) or be removed from the suggested route list.

Figure 14:
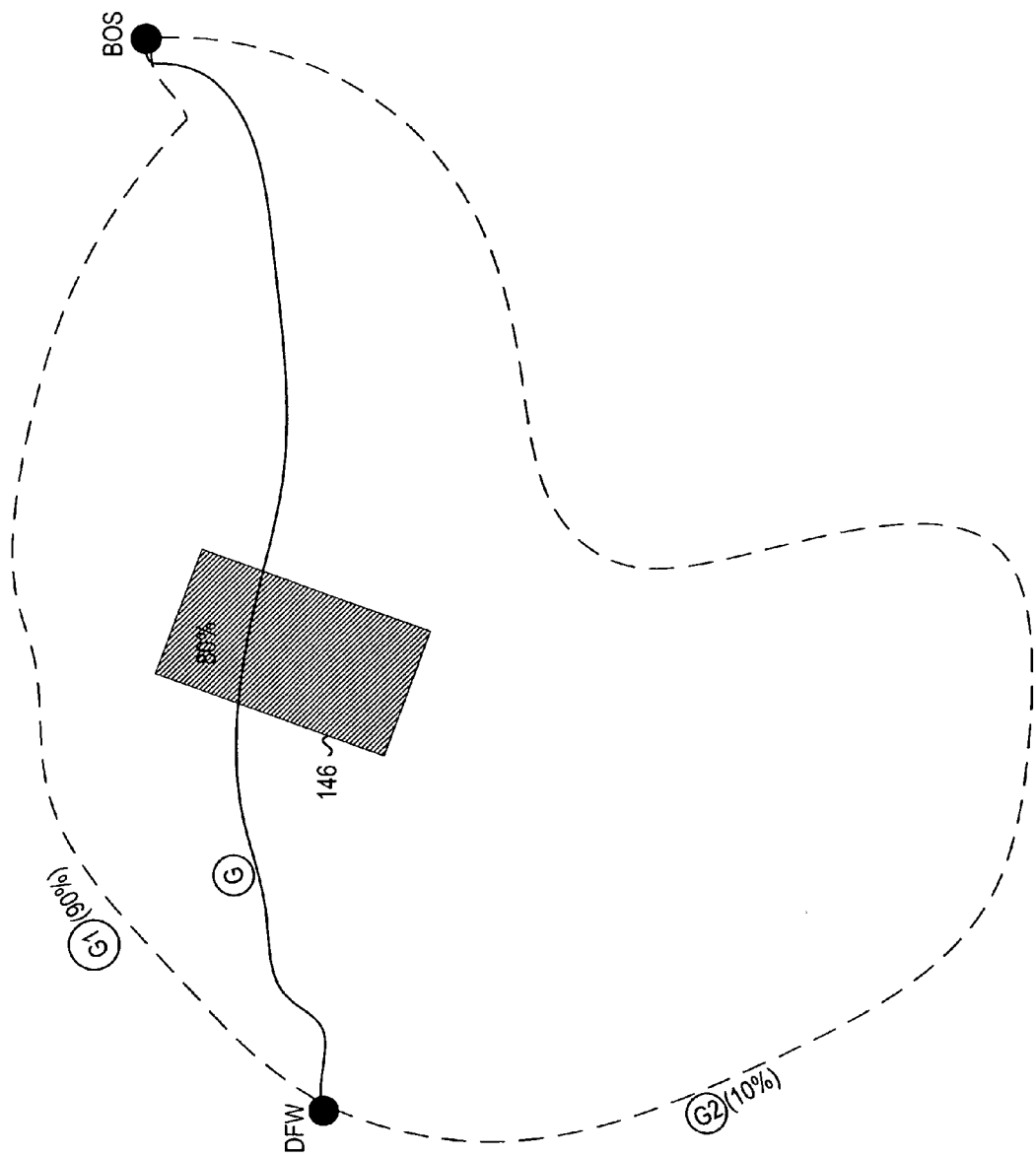
FIG. 14 is a second example of suggested routes in accordance with the plan operations feature of FIG. 8.
Figure 15:
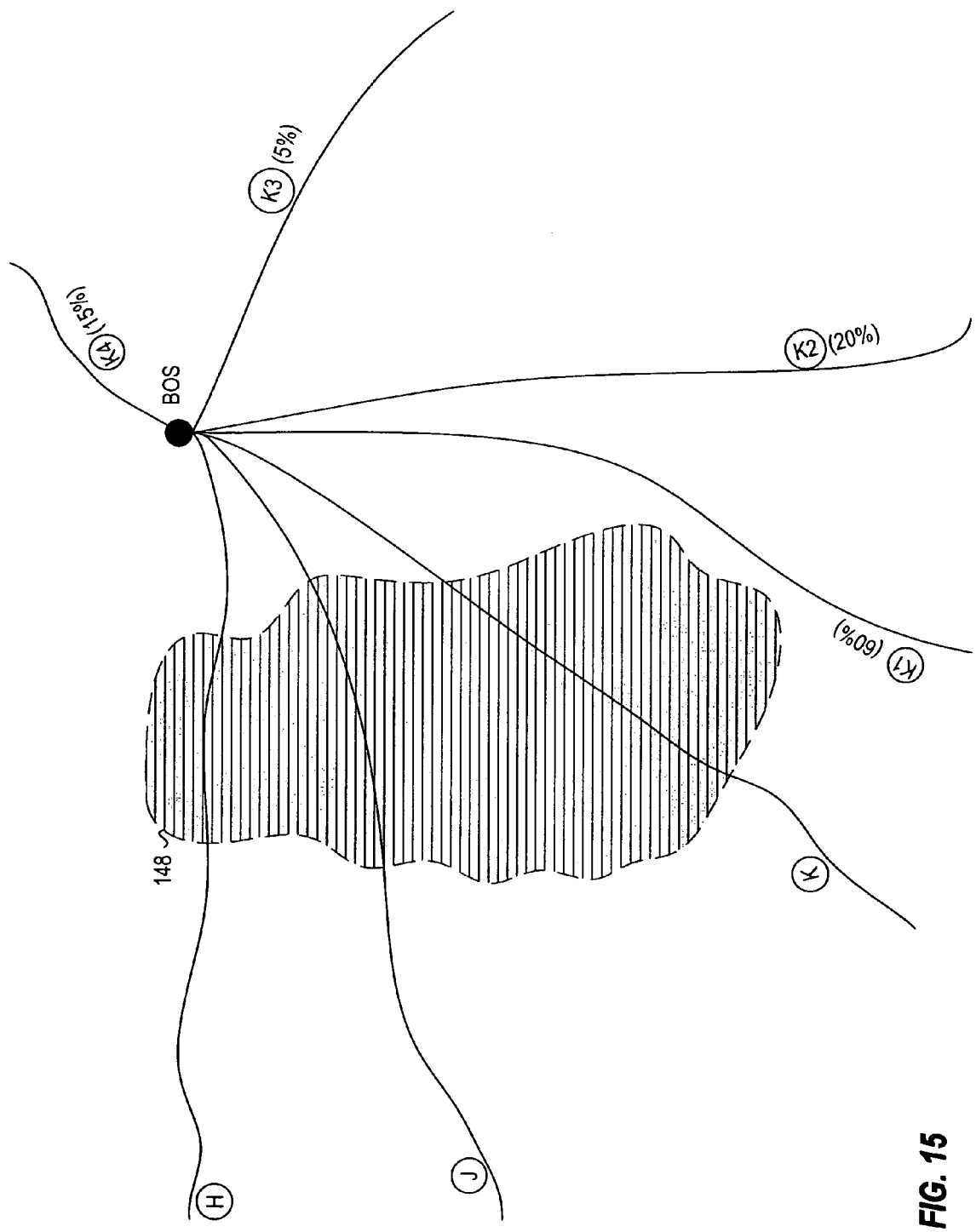
FIG. 15 is a third example of suggested routes in accordance with the plan operations feature of FIG. 8.

Two additional exemplary implementations of the propose routes feature 118 are shown in FIGS. 14 and 15. In FIG. 14, the traveler desires to fly from Dallas (DFW) to Boston (BOS). The plan operations feature 140 has proposed a ranked list of routes (not shown) and the traveler 110 has selected 'Route G'. FIG. 14 shows that the traveler has selected additional information about Route G, but that an event (weather or otherwise) 146 has been identified as projected to occur within the flight path of Route G. The plan operations feature 140 has further determined that the event 146 has an 80% chance of occurring along Route G within the same time period of the traveler 110 departing from DFW along Route G. Therefore, the plan operations feature 140 has also determined, based on current conditions, predicted conditions, operational parameters and statistical/historical analysis that Routes G1 and G2 have a 90% and 10% chance, respectively, of receiving air traffic diverted from Route G as a result of the event 146. Accordingly, the traveler or user 110, knowing ahead of time (a) the likely occurrence of event 146; and (b) the likely re-routes if the event 146 actually does occur, can make an informed and timely decision about departure time, flight plan, fuel, and desired destination, among other factors. Such information and corresponding decision(s) resulting therefrom could be made by the traveler or user 110 en route.

Similarly, in FIG. 15, the traveler 110 is en route and approaching Boston along Route K. Unfortunately, Routes H, J and K will intersect a SIGMET 148 that covers a relatively large area. The plan operations feature 140 receives all of the relevant inputs, and, based on current conditions, predicted conditions and statistical/historical analysis, determines that Routes K1, K2, K3 and K4 have a 60%, 20%, 5% and 15% chance, respectively, of receiving air traffic diverted from Route K as a result of the SIGMET 148. However, because Routes H and J are also affected by the SIGMET 148, it is likely, based on historical analysis and current conditions, that alternate Routes K1, K2 and K4 will incur significant additional traffic from Routes H and J, as well as from Route K. Therefore, the plan operations feature 140, would recommend that the traveler 110 utilize Route K3, even though it is significantly farther out of the way than Route K1 or K2.

Once the traveler 110 selects a route corresponding to the entered location pair (either from the UserRoute table 264 or a route suggested by the plan operations feature 140), the select routes feature 122 of the personalized transportation information system 100 preferably forwards the selected route information to a create visualization feature 124. Additionally, the selected route information may be provided to the access personal information feature 114, such that the user profile 250 is updated to store the selected route in the UserRoutes table 264.

Figure 16:
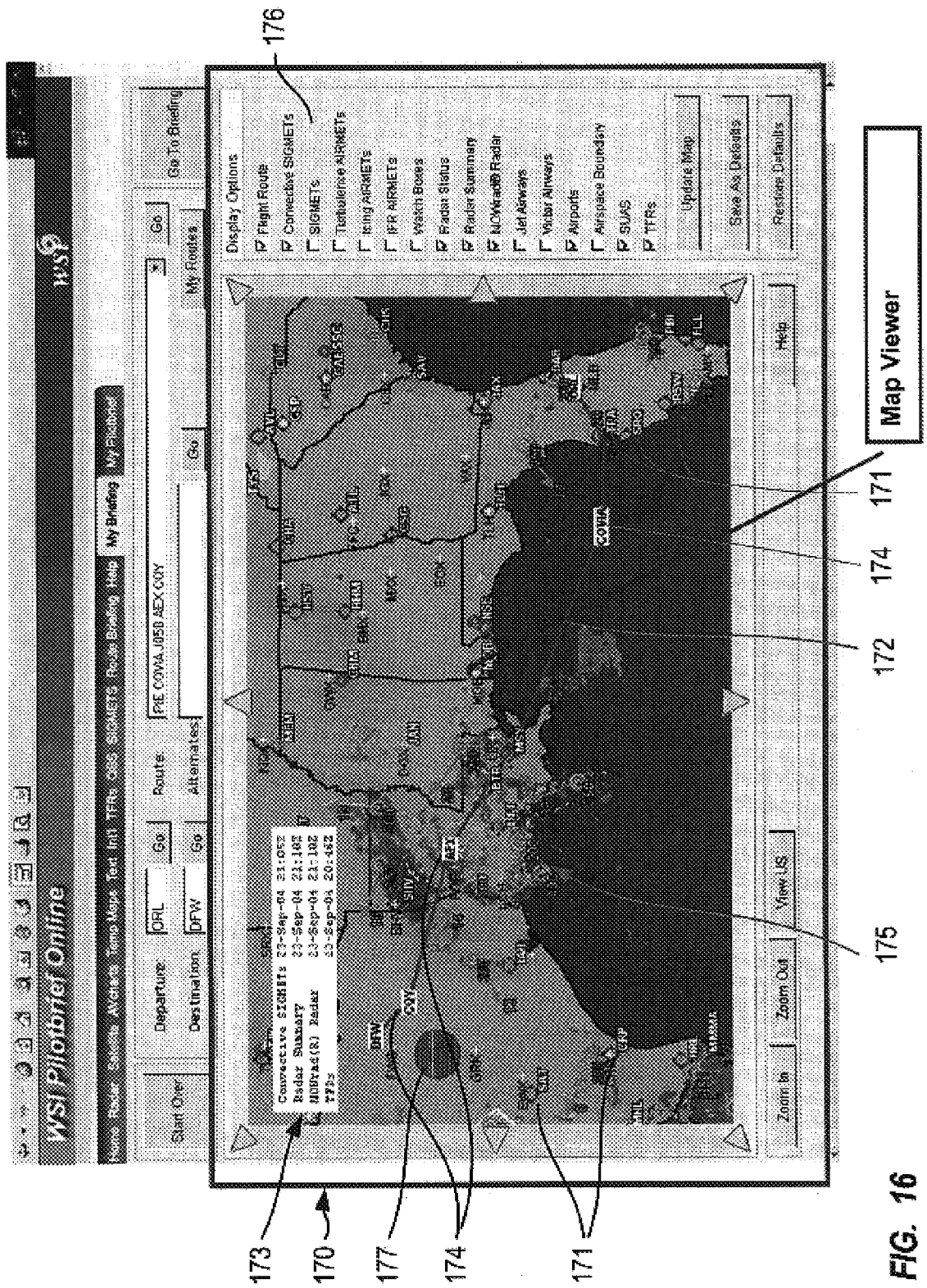
FIG. 16 is an example of a visualization of a selected route in accordance with the personalized transportation information system of FIG. 1.

Referring to FIG. 16, the create visualization feature 124 presents a map viewer 170 that depicts a geographically accurate map corresponding to the selected route and showing one or more attributes related to the selected route. The create visualization feature 124 presents the map viewer 170 or other visualization to the traveler 110 on the display 115. The map viewer 170 may include a display options panel 176 for the traveler 110 to designate which features are shown on the map viewer 170. In the example of FIG. 16, a route path 172 from ORL to DFW is shown, including one or more of the route identifiers 174 along the route path 172. The map viewer 170 also identifies other airports 171 within the view of the map 170, radar status and summary 173, weather radar 175 and a temporary flight restriction 177. The map viewer 170 thus allows the traveler 110 to visually identify the location of (and thus relationship to the selected flight path 172) any existing and/or predicted weather events, air traffic, or any other item of information that may have an effect on the selected flight path 172. In FIG. 16, features such as Jet and Victor Airways, turbulence, icing and airspace boundary have not been selected from the display options panel 176, and thus would not be shown in the map viewer 170, should such conditions exist. The traveler 110 may zoom in or out on the map viewer 170 and may also geographically navigate within the map viewer 170 to visualize different portions of the surrounding area, as is generally known in the art.

Figure 17:
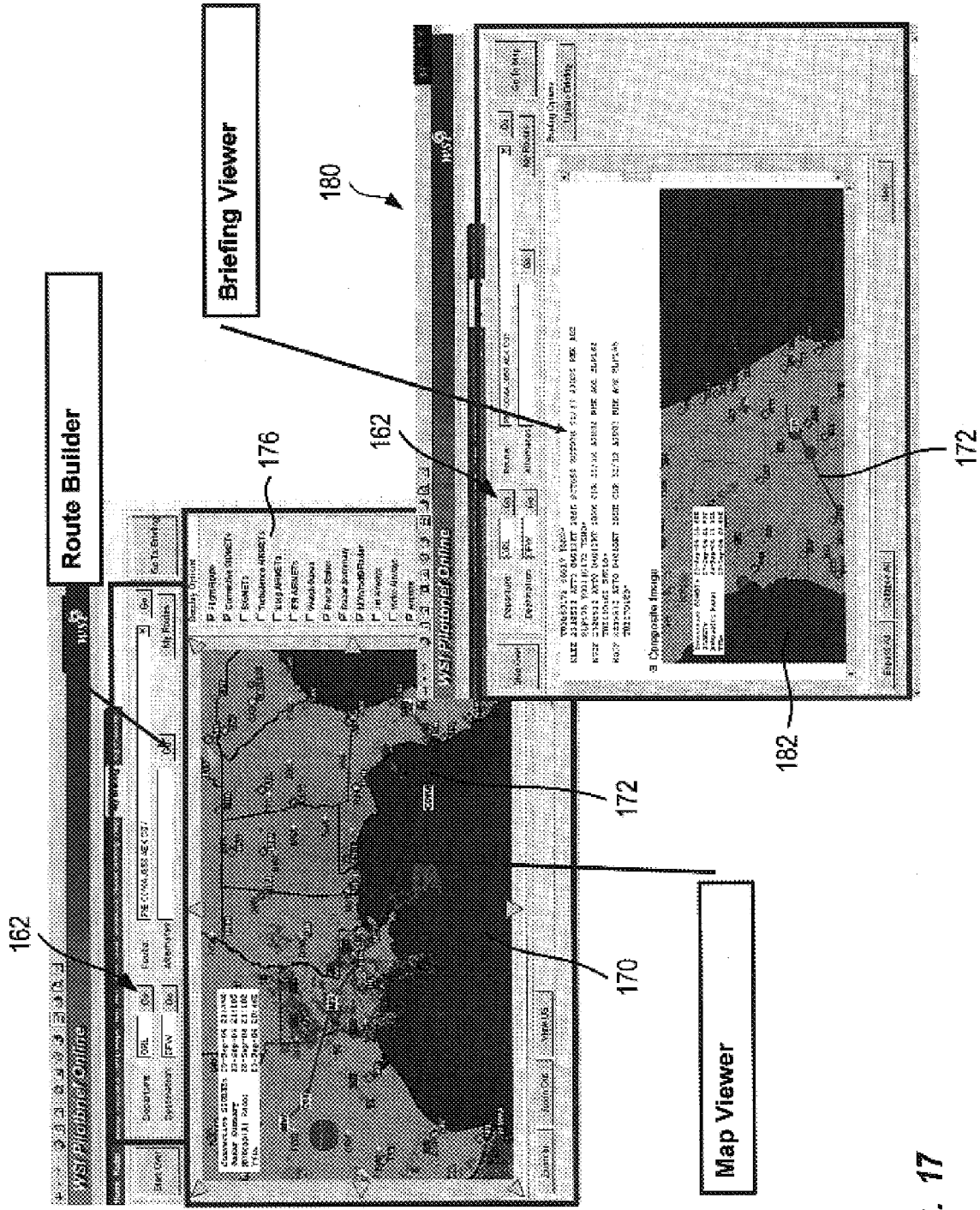
FIG. 17 is an example of a travel briefing in accordance with the personalized transportation information system of FIG. 1.
Figure 18:
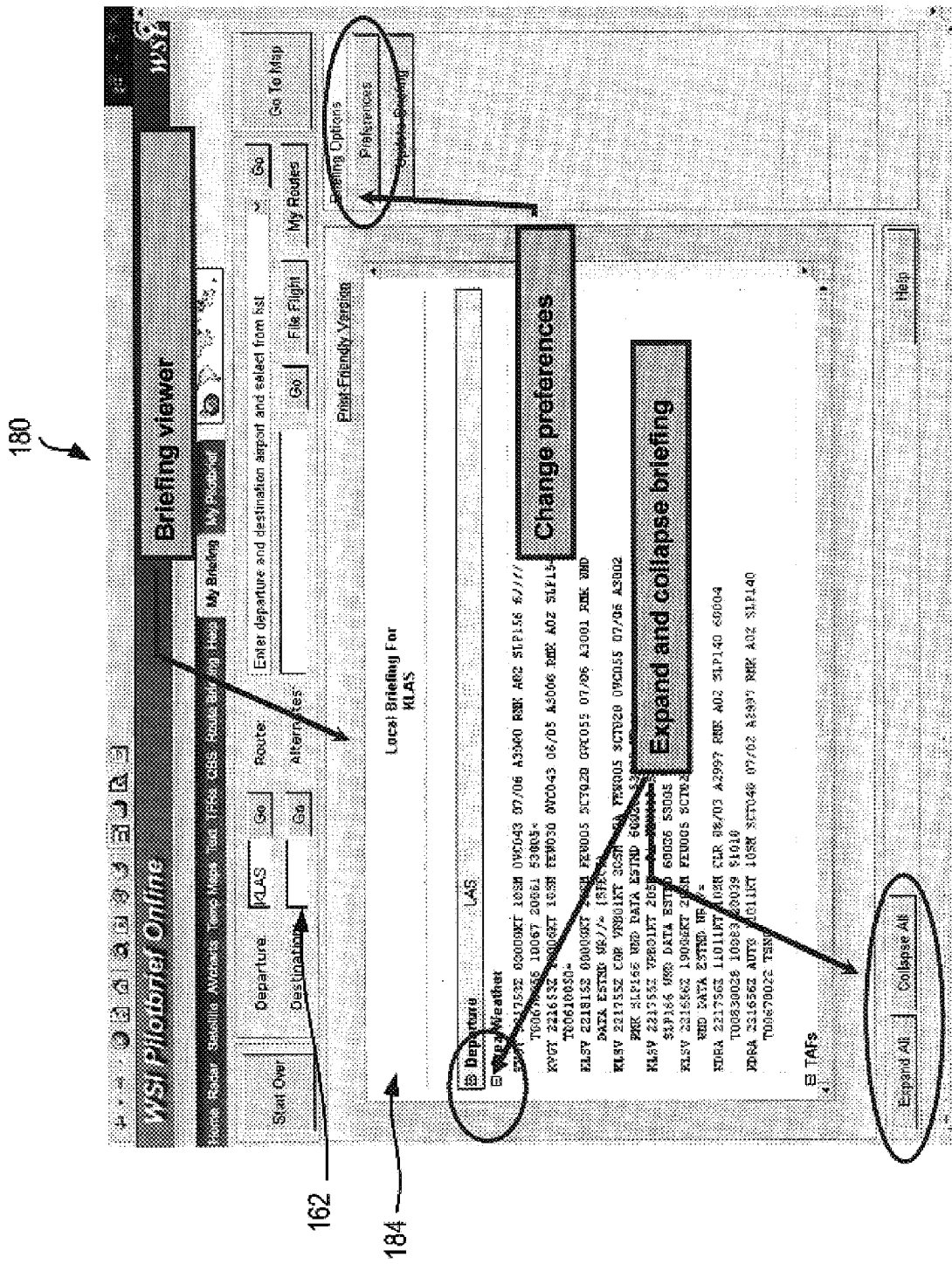
FIG. 18 is an example of a travel briefing in accordance with the personalized transportation information system of FIG. 1.

Referring to FIGS. 1, 17 and 18, the personalized transportation information system 100 includes a generate briefings feature 126 that generates a travel briefing corresponding to the entered location pair and/or the selected route. The generate briefings feature 126 compiles the information generated by the transportation information engine 105 and provides composite transportation information customized according to the relevant weather and operational parameters, including business objectives as discussed above, to the traveler or user 100. Travel briefings may include the weather-related information supplied to a pilot or operator prior to departure and/or during flight, including weather in and around the departure point, current and predicted weather and events en route along the selected flight path and weather conditions and predictions for the destination and alternate points. The travel briefing is displayed to the traveler 110 in a briefing viewer 180 that allows the traveler 110 expand and collapse different portions of the briefing for quick access to and review of desired sections (see FIG. 18). The travel briefing preferably includes composite geographical images 182 of the departure and destination regions corresponding to the selected route displayed together the text of the briefing. The composite images 182 preferably include some of the features included in display of the route path 172 in the map viewer 170. As discussed above, preferences set by the traveler 110 will cause the briefing viewer 180 to initially display certain aspects of the briefing and on the composite images 182. Thus, the travel briefing obtained by the traveler 110 is customized to the selected route and destination, as well as to the traveler's preferences, including business objectives, predictive weather data and relevant operational parameters. However, the traveler 110 may alter those preferences to create a display of additional or different aspects of the travel briefing. The map viewer 170 may be displayed together with all or a portion of the briefing viewer 180.

As shown in FIG. 18, the personalized transportation information system 100 preferably also includes a local briefing feature 184 that allows the traveler 100 to enter only one geographical point (and not a complete location pair) and obtain a localized travel briefing for that geographic area. When obtaining a local briefing, a route need not be selected by the traveler 110. Therefore, any text, images or information displayed by the briefing viewer 180 do not reflect a particular route.

The personalized transportation information system 100 further includes a generate alerts feature 130 that determines, based on default and/or traveler preferences, if and when alerts regarding weather or other events associated with a selected or potential flight path should be issued. The user profile 250 may include threshold preferences for different types of weather and non-weather event conditions. That is, since every traveler, pilot, company, etc., has a different tolerance for different types of events, the generate alerts feature 130 will examine the threshold(s) set in the user profile 250 in determining whether to issue an alert for a given event for the traveler 110. Accordingly, the traveler 110 or user may also set individual alert thresholds for use by the generate alerts feature 130. For example, a user of the personalized transportation information system 100 may be a commercial airline, and therefore, be particularly sensitive to turbulence for the safety and comfort of its passengers. Therefore, the pilot for the airline (i.e., the traveler 110) may set a low turbulence alert threshold, desiring to be notified of any turbulence within a certain range of the pilot's selected route. The pilot, however, may not be especially interested in icing, and therefore set the alert threshold for such an event relatively high. Moreover, the generate alerts feature 130 may be implemented such that the traveler 110 is not directly notified by the personalized transportation information system 100, but rather by an external source. For example, a commercial airline may have a dispatcher that notifies pilots of any necessary information, including alerts. In such a system, the generate alerts feature 130 would be configured to notify the dispatcher of the relevant alert.

In one embodiment, the generate briefings feature 126 and/or the generate alerts feature 130 reference operational parameters, such as business objectives, from the personalization database 200 or the geographical-navigational reference database 300, to determine the contents of a travel briefing or the trigger or notification of an alert. For example, depending on particular business objectives or goals of a commercial airline, a travel briefing may include a notice that a particular route is being given preference since it is known that a VIP is flying along that route.

Figure 19:
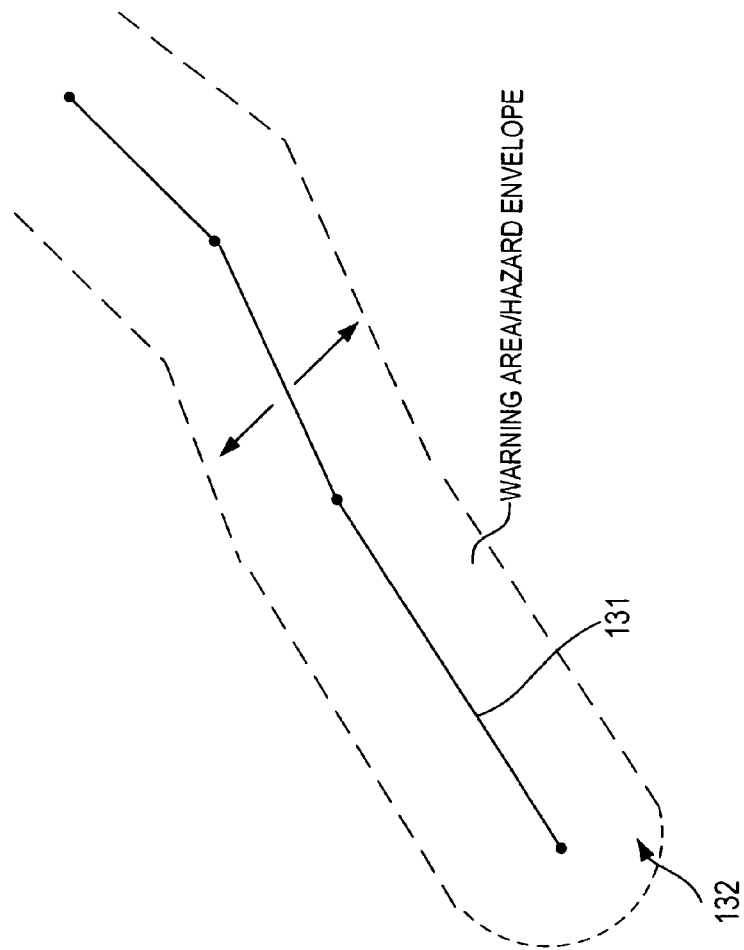
FIG. 19 is an example of a visualized alert in accordance with the personalized transportation information system of FIG. 1.
Figure 20:
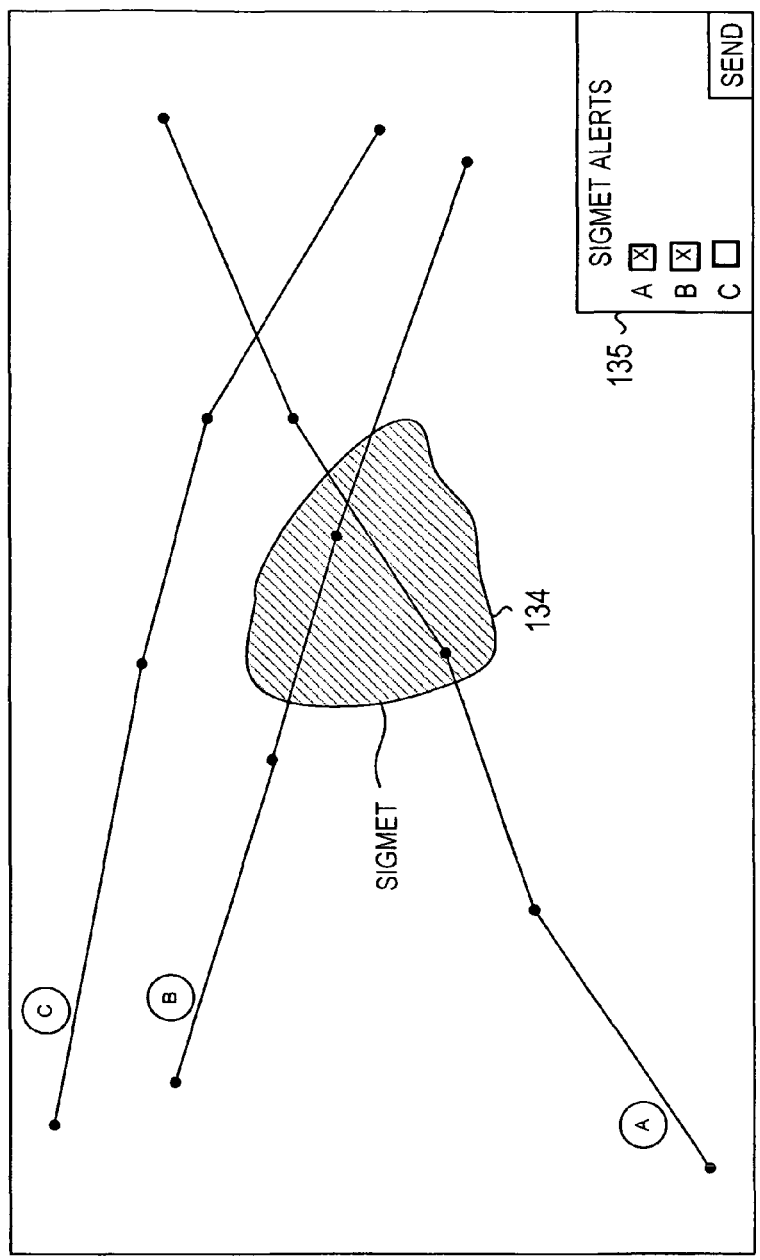
FIG. 20 is an example of a visualized alert in accordance with the personalized transportation information system of FIG. 1.
Figure 21:
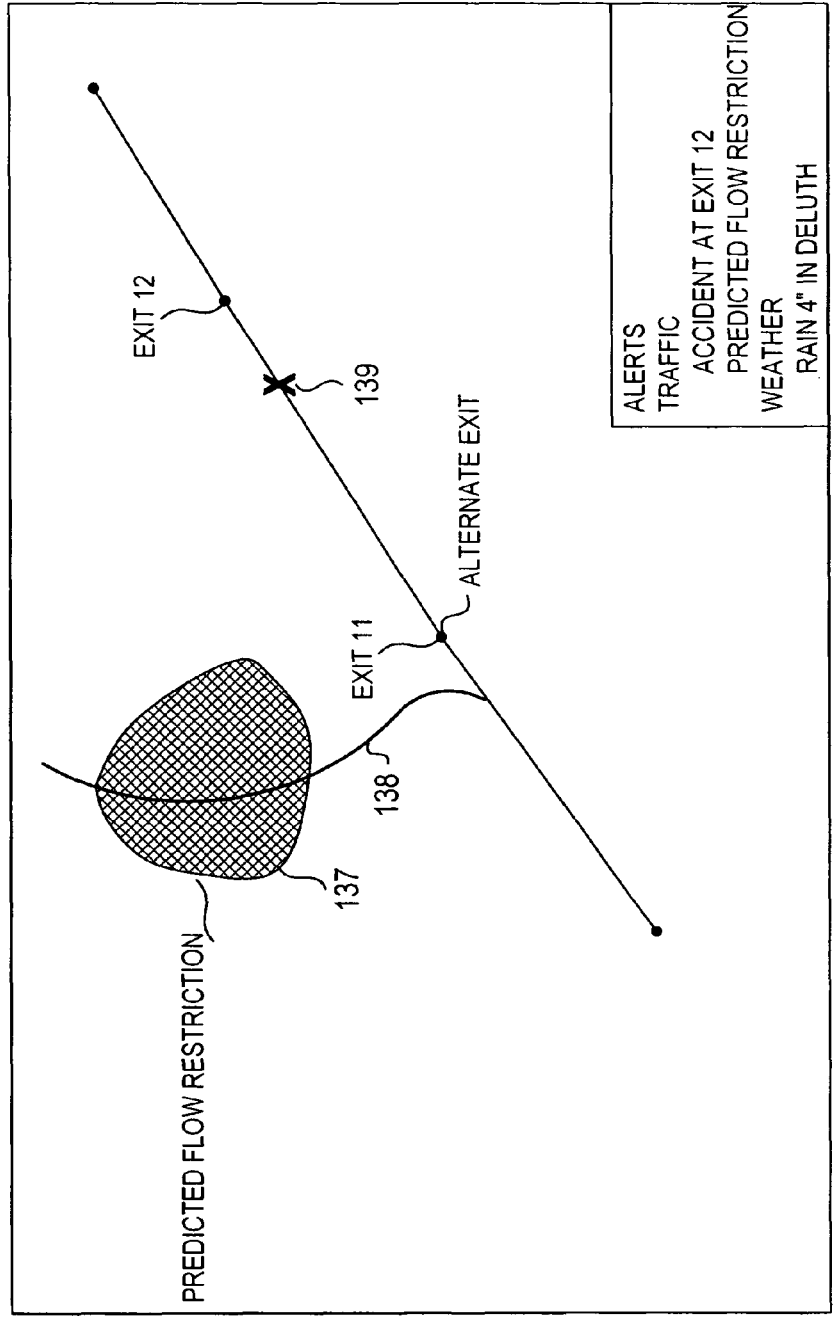
FIG. 21 is an example of a visualized alert in accordance with the personalized transportation information system of FIG. 1.

FIGS. 19-21 illustrate several different implementations of the create visualization feature 124 in combination with the generate alerts feature 130. In FIG. 19, the traveler 110 is provided with a warning area or hazard envelope 132 that surrounds the selected route 131 by an approximately equal distance in all directions (i.e., 3-dimensional) with respect to the present location of the aircraft on the route 131. According to this implementation and visualization of the generate alerts feature 130, the traveler 110 would be alerted if a designated event was predicted or occurred anywhere within the hazard envelope 132. Those skilled in the art will understand that the hazard envelope 132 could be personalized for the traveler 110 or for the type of aircraft or vehicle. Moreover, an occurrence of any actual or predicted event could generate an alert; however, an alert would only be issued if the event surpassed the set threshold level. In an alternative embodiment, the generate alerts feature 130 may cooperate with the plan operations feature 140 to suggest an alternate routing to avoid the actual and/or predicted weather or non-weather event.

FIG. 20 is an example of an implementation of the generate alerts feature 130 where a dispatcher for an airline is able to select a flight within the context of an actual or predicted SIGMET to notify selected flights. In FIG. 20, the dispatcher has been notified of the SIGMET 134, as well as its proximity to flights planned on Routes A, B, and C. The alert auto-generates a selectable flight list and concise alert message based on the dispatcher's or airline's stored preferences (i.e., generate an alert if moderate to severe turbulence, and flight entry and exit times coincide with event-valid times, etc.). When the dispatcher receives the alert, the dispatcher is able to select the flights on Routes A and B that should receive a SIGMET alert 135, for which the appropriate alert boxes have been checked. The dispatcher can then send the SIGMET alert to the pilots on Routes A and B by any number of methods. In the example of FIG. 20, the dispatcher elected not to alert flights on Route C of the SIGMET 134.

FIG. 21 is an example of an implementation of the generate alerts feature 130 for an automotive traveler 110. In FIG. 21, the traveler 110 is traveling along route 136, with the intention of turning onto route 138. However, the traveler 110 is alerted to a predicted flow restriction 137 along route 138 due to heavy rain. Additionally, the traveler 110 is alerted to an accident 139 prior to exit 12 on route 136, also resulting in a predicted flow restriction. Accordingly, based on these predictions and alerts, the traveler 110 may opt to depart route 136 at exit 11. In an alternative embodiment, the generate alerts feature 130 may cooperate with the plan operations feature 140 to suggest an alternate routing to avoid the predicted flow restriction(s).

Figure 22:
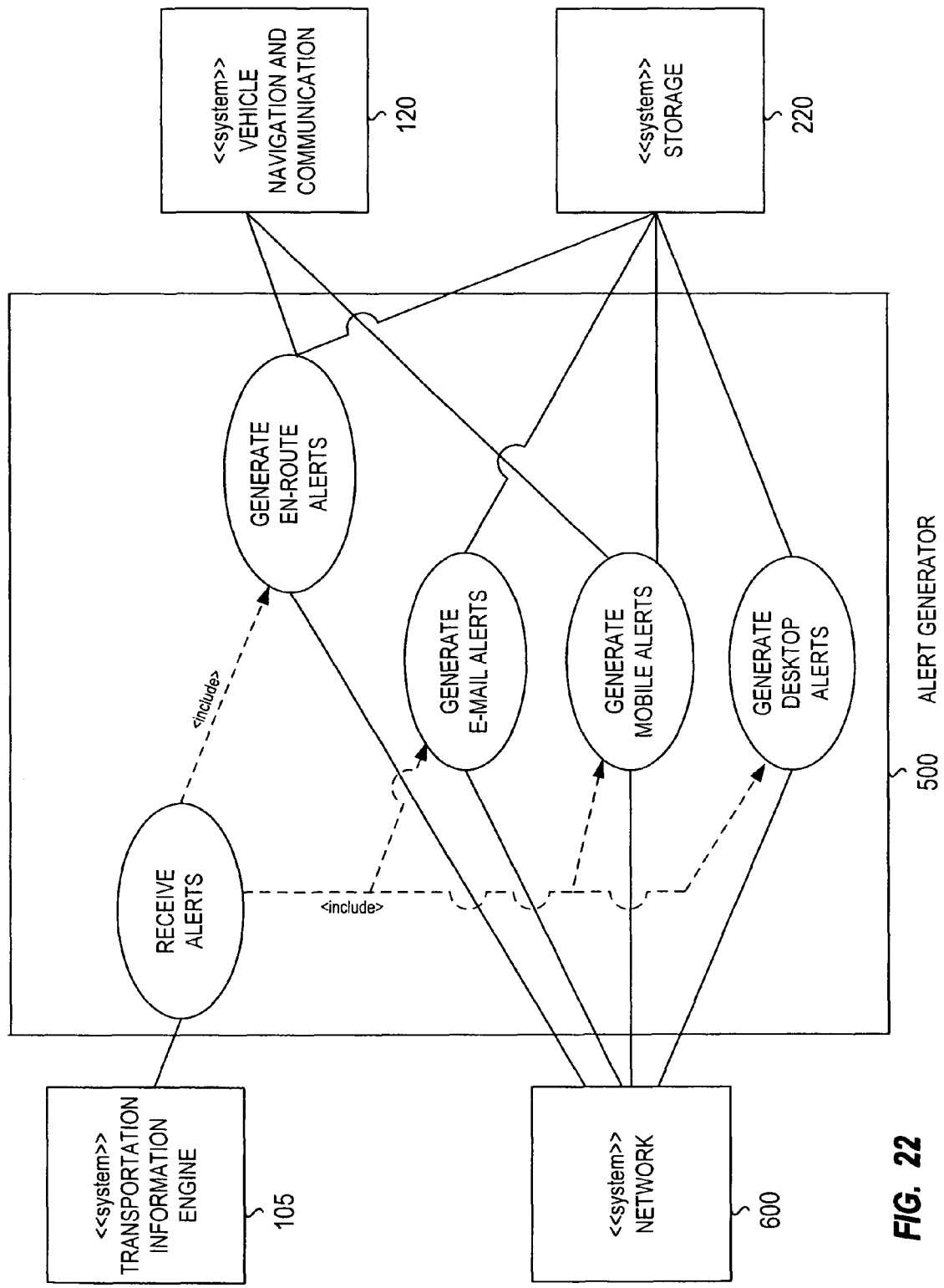
FIG. 22 is a UML diagram of the alert generator of the personalized transportation information system of FIG. 1.

In FIG. 22 the alert generator 500, receives alerts from the generate alerts feature 130 of the transportation information engine 105, and dispatches the alerts using one or more forms of communication, including, in-flight communications with aircraft, e-mail, text message, mobile (i.e., some form of audio communications) and desktop computer. Additionally, all of the alerts are capable of being transmitted over a network 600 and are also archived in the storage unit 220.

In another embodiment of the present invention, the personalized transportation information system 100 is configured to be used by a service provider to enable the service provider to locate, target, track and/or market services to potential or existing customers. For example, a Fixed Base Operator ("FBO") is an entity, generally located at an airport, that provides aircraft services to aircraft operators, such as fueling, cleaning, catering, etc. FBOs desire to target and market to both existing and potential customers to encourage the customers to land at their location (e.g., an airport) and utilize their services. To this end, FBOs often provide incentives for travelers and pilots to use their services, such as providing a round of golf at a nearby county club or having a pilot's favorite food available when his aircraft lands.

In connection with the personalized transportation information system 100, the personalization database 200 may include operational parameters related to service provider or FBO customers, destinations, origins, aircraft size, travel habits, hobbies, eating habits, entertainment, rental vehicles and any other characteristic about a particular pilot, owner or flight crew that would assist an FBO in determining how to target that particular customer. Accordingly, the user profile 250 requests and stores additional information or operational parameters regarding traveler characteristics. An FBO may attempt to generate a profile for each customer or potential customer.

Figure 23:
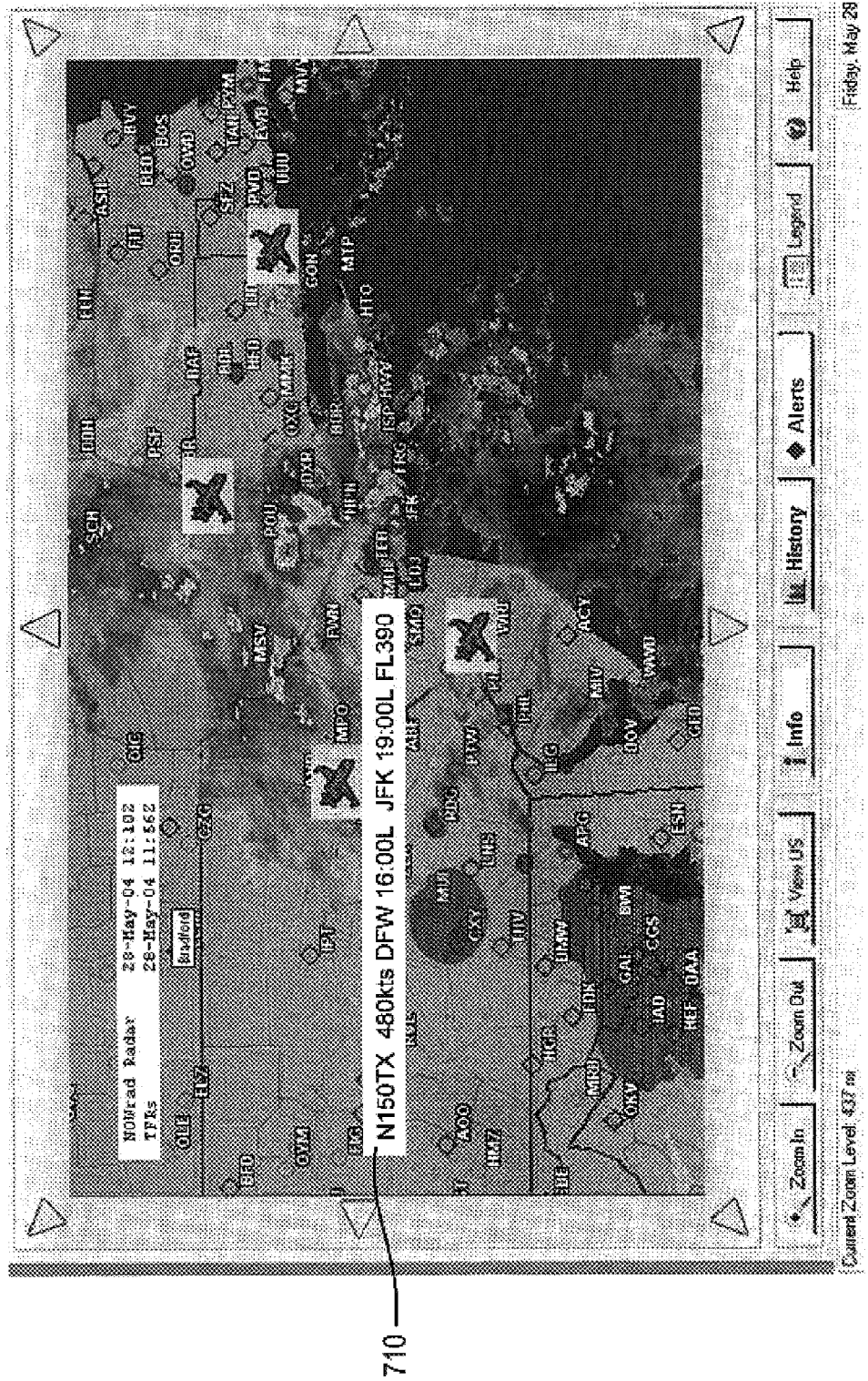
FIG. 23 is an example of an FBO aircraft tracking map in accordance with the personalized transportation information system of FIG. 1.
Figure 24:
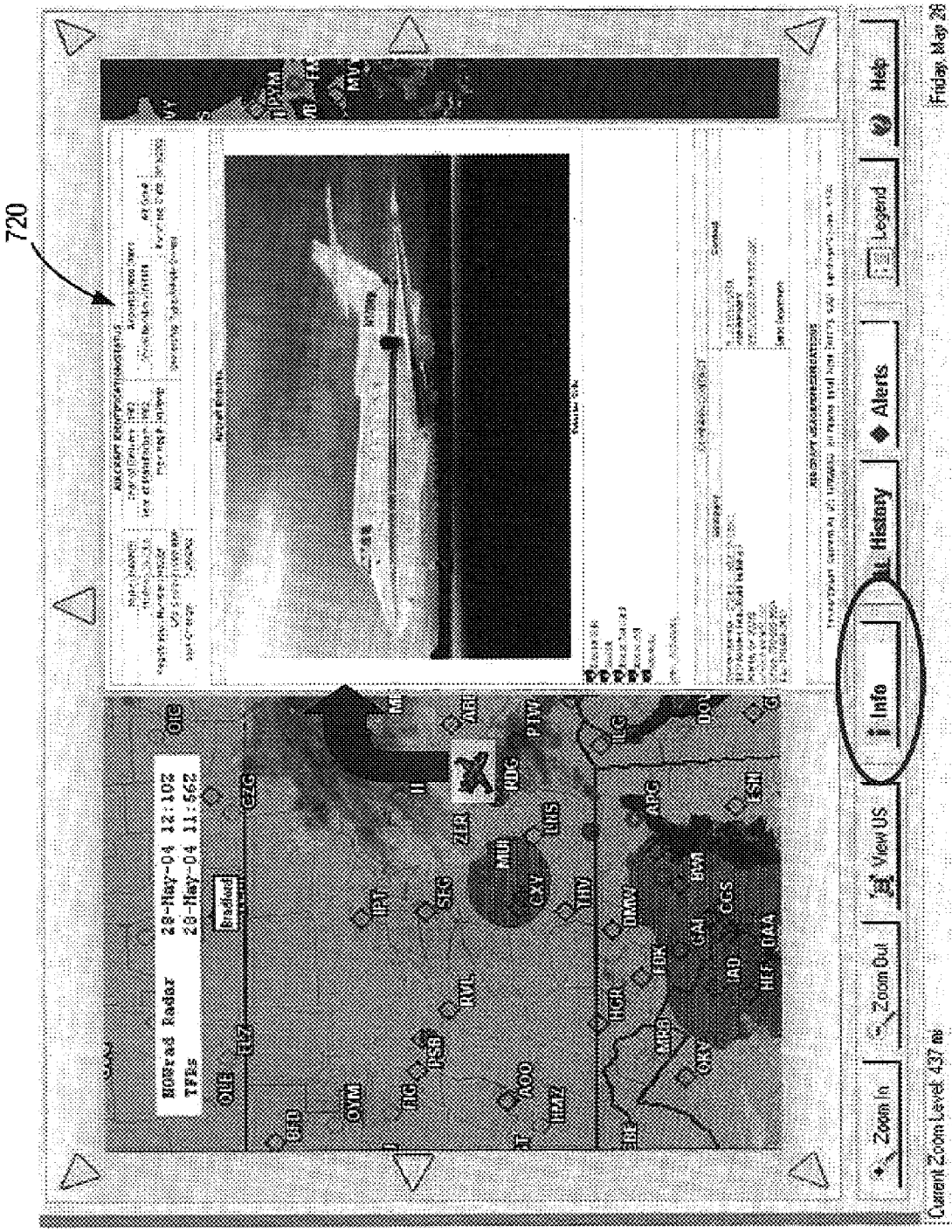
FIG. 24 is an example of an FBO aircraft information screen in accordance with the personalized transportation information system of FIG. 1.

In accordance with an embodiment of the present invention, an FBO could track flights destined for or passing through the area in which the FBO is situated. FIG. 23 shows a visualization 700 of the personalized transportation information system 100 that includes several aircraft en route to TEB airport in New Jersey. An FBO located nearby tracks the flights and identifies a particular flight 710 that may be of interest. As shown in FIG. 24, the FBO may obtain aircraft identification and status information 720 about the flight 710. The identification information 720 could include any relevant operational parameters associated with the flight plan of the aircraft, including the tail number, the owner, pilot, as well as the destination and flight path. Based on such information, the FBO might update its profile (or create a new one) associated with that aircraft and/or pilot to target advertisements or future incentives or provide a higher level of customer service.

The FBO could also utilize the plan operations feature 140 of the personalized transportation information system 100 to determine if and how current and/or predicted weather or events might impact the flight plans and/or operational parameters of aircraft passing through its region. For example, an FBO, knowing the present location of an aircraft and its flight plan (i.e., destination), could determine its likely flight path and determine if there are any potential operational parameters or weather conditions that would divert or alter the flight path of the aircraft, thereby necessitating the aircraft in question to land for additional fuel. Alternatively, the FBO could obtain briefings from the generate briefings feature 126 specific to the aircraft's destination or flight plan and make additional assumptions about the aircraft's needs.

Figure 25:
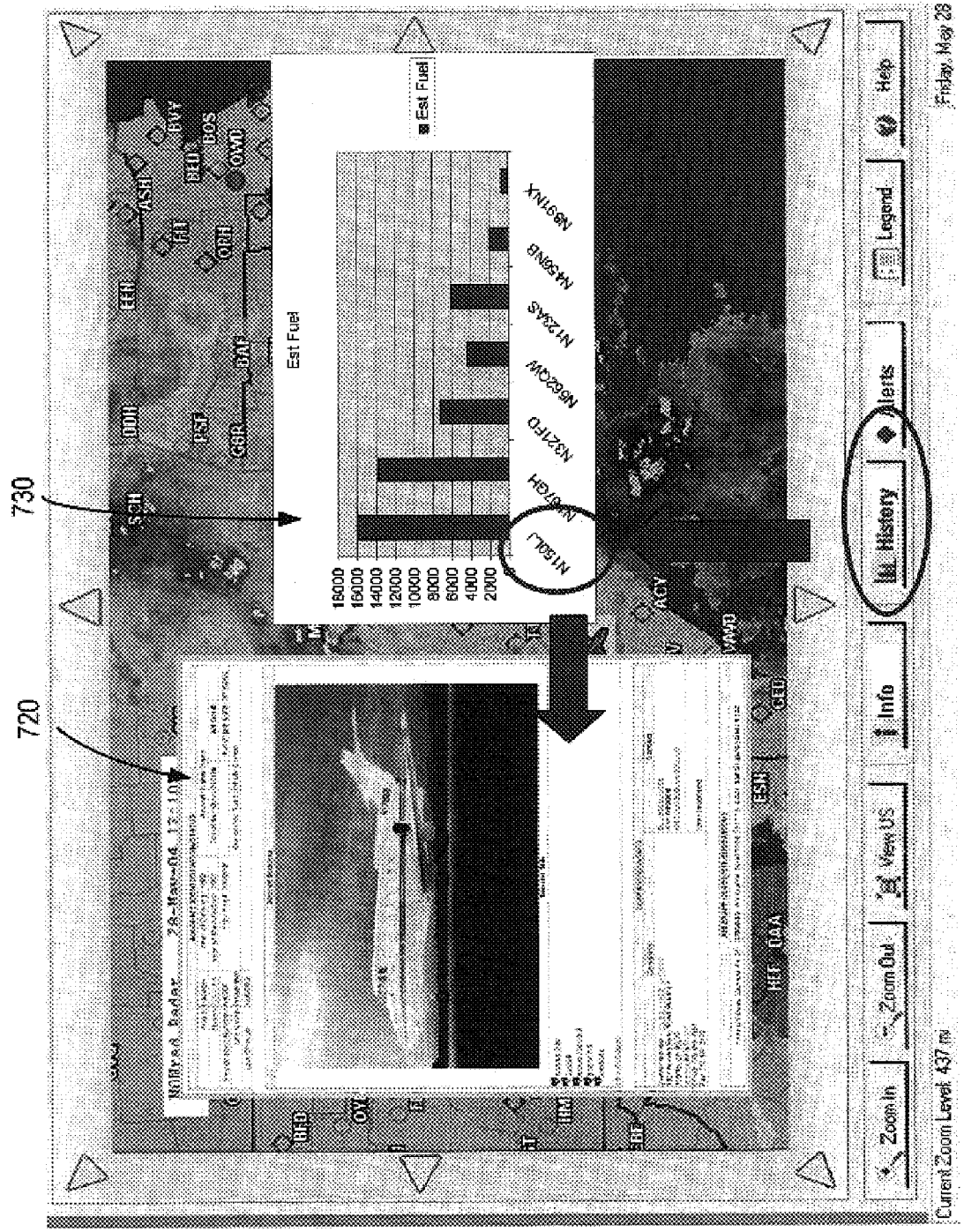
FIG. 25 is an example of an FBO aircraft tracking map in accordance with the personalized transportation information system of FIG. 1.

In an alternative embodiment, as shown in FIG. 25, the personalized transportation information system 100 is configured to provide a visualization and determination of the aircraft in the FBOs region and their potential fuel consumption 730 or historical fuel demand. In FIG. 25, the FBO can compare the different aircraft and attempt to contact and market to those requiring the potentially largest fuel purchase. Such fuel calculations could be provided by the personalized transportation information system 100 in view of current and predicted weather end events along the flight paths of the known aircraft.

Figure 26:
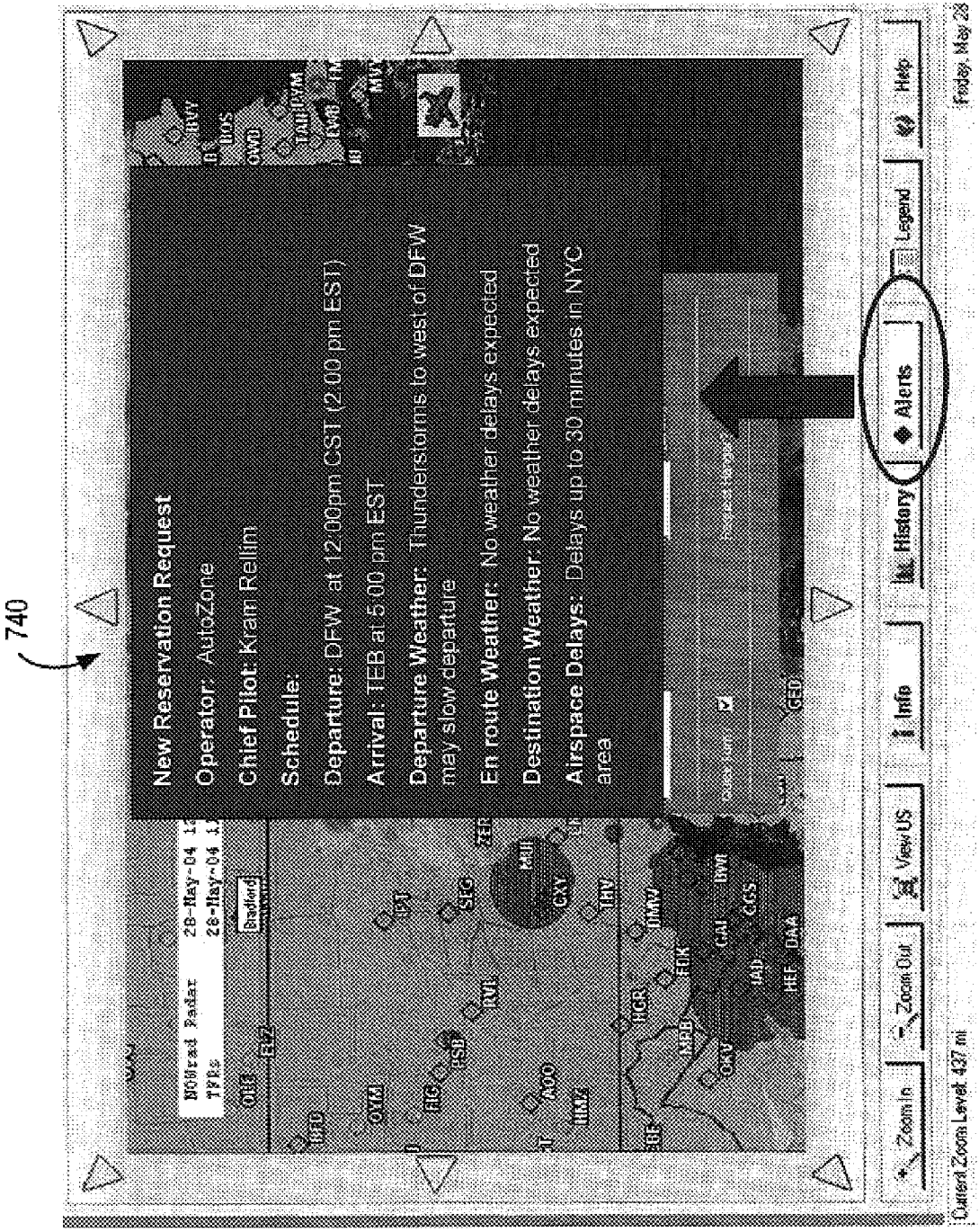
FIG. 26 is a visualization of an FBO aircraft reservation screen in accordance with the personalized transportation information system of FIG. 1.

FIG. 26 illustrates an embodiment that includes a reservation request 740 generated by a customer to an FBO. In FIG. 26, using the personalized transportation information system 100, the FBO obtains operational parameters (e.g., flight plan, predicted delays and other information) related to the incoming aircraft. With such knowledge the FBO servicing this aircraft has the ability to better address the needs of the aircraft and crew upon arrival.

Figure 27:
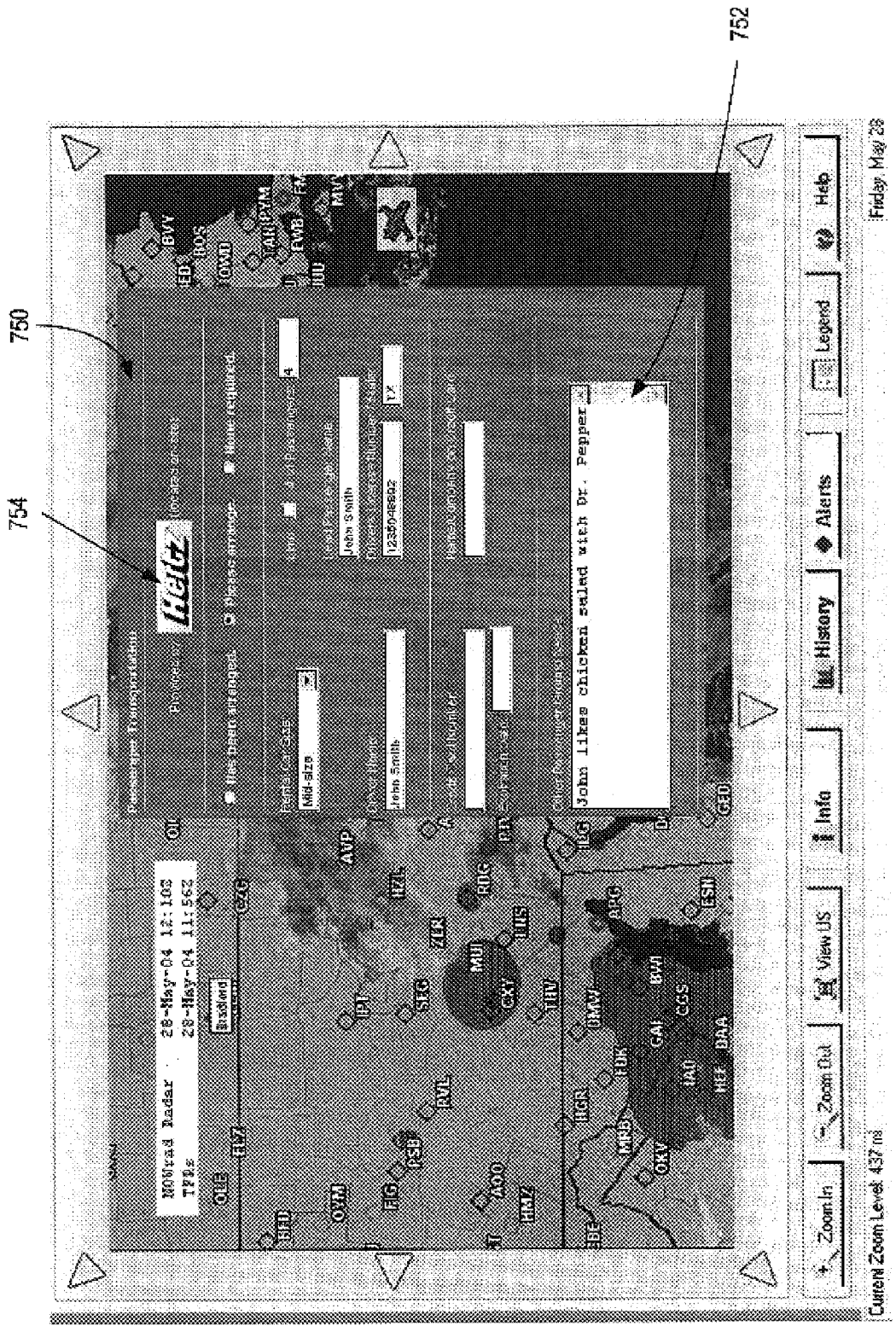
FIG. 27 is an example of an FBO passenger information display in accordance with the personalized transportation information system of FIG. 1.

FIG. 27 illustrates an example of a passenger transportation form 750 that might be used by an FBO to arrange for transportation needs or requests by an arriving pilot or passenger. The passenger transportation form 750 might be used in conjunction with the reservation request 740 of FIG. 26 and/or the aircraft identification information 720 or aircraft fuel consumption of FIGS. 24 and 25. Such an information display or form includes detailed personalized passenger information 752 that may be of interest to the FBO or the person or entity fulfilling the FBO requirements. For example, in FIG. 27, it is known that VIP passenger John Smith "likes chicken salad . . . . " Thus, the FBO would attempt to make such food available to John Smith upon arrival. Additionally, as shown in FIG. 27, an FBO may incorporate advertising 754 into the displays or forms that are available to the pilot, passenger or crew.

In another embodiment, an FBO preferably purchases advertisement space to target at customers based on the predicted flight paths and changes thereto obtained from the personalized transportation information system 100.

Figure 28:
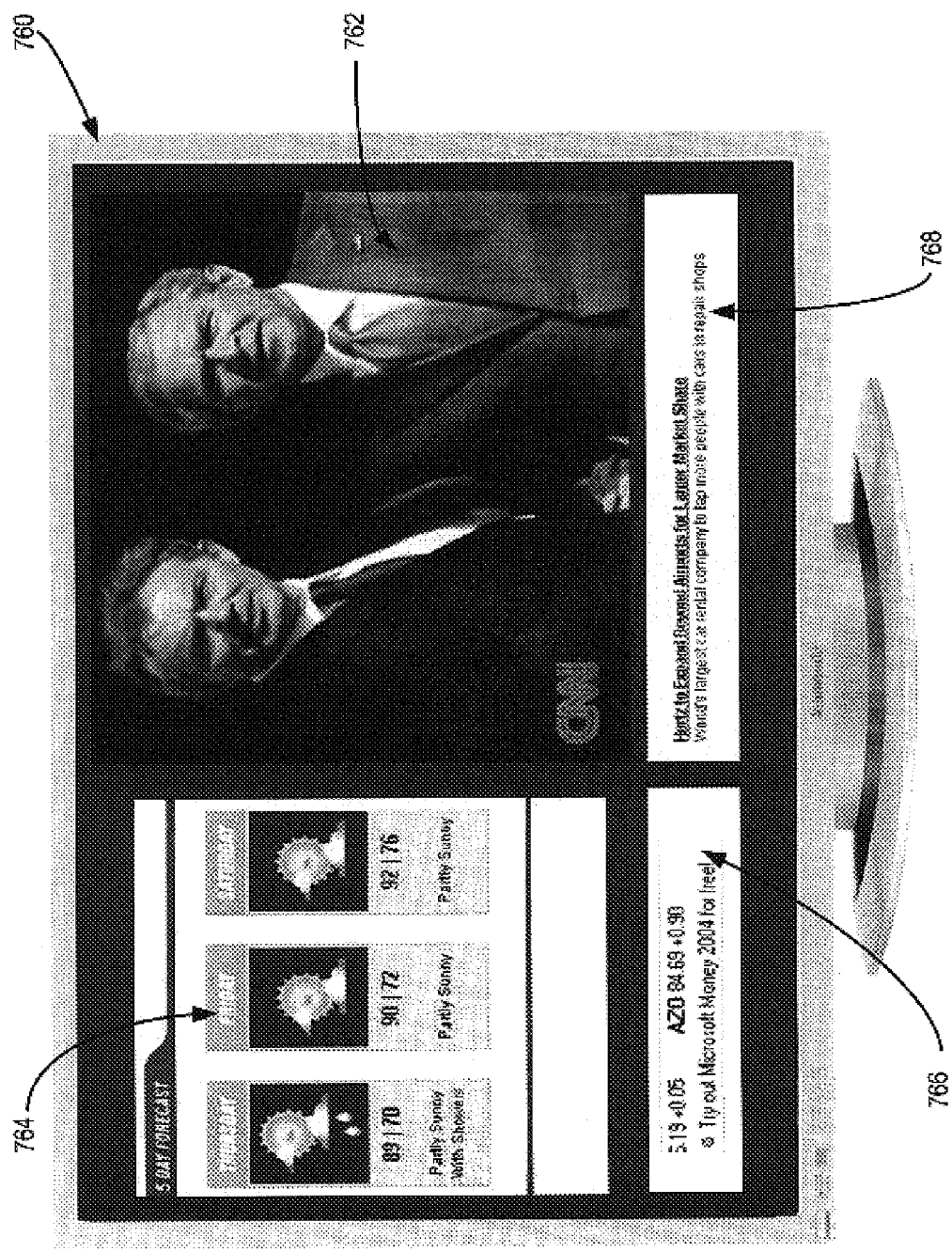
FIG. 28 is an example of an FBO multimedia presentation in accordance with the personalized transportation information system of FIG. 1.

In another embodiment shown in FIG. 28, an FBO develops a multimedia presentation, display, feed or stream 760 for viewing by an arriving pilot or passenger. The multimedia presentation 760 provides the FBO with additionally opportunity to sell advertising space and/or provide customized services for an arriving pilot or passenger. The multimedia presentation 760 may be customized to the passenger based on data known to the FBO and/or obtained from the personalization database 200 of the personalized transportation information system 100. More specifically, the multimedia presentation 760 may include items of information (e.g., news, stock, current and predicted weather, current and predicted delays, etc.) pertinent to the arriving aircraft or the people on it. For example, if the FBO knows that the arriving aircraft is owned by company X, the multimedia presentation 760 may include news and/or stock information that may be of interest to senior officials of company X. The FBO may also assume, from the aircraft and flight plan data, that the aircraft (and therefore, the pilot or passengers) are destined for a particular destination(s), and therefore, provide weather and travel information for those destinations as generated by the personalized transportation information system 100. The multimedia presentation 760 may include real-time or delayed media streams 762 (including cable, video, satellite and broadcast), including news, weather and sports information that is incorporated with the personalized travel information from the personalized transportation information system 100. The FBO is preferably able to instantaneously change the channel of the integrated media stream 762 according to the arriving customer. The multimedia presentation 760 may also include customized alerts, text messages or news clips 768 generated by the FBO and/or the personalized transportation information system 100. In the example of FIG. 28, the multimedia presentation 760 includes a live news stream 762, a weather forecast 764 for corresponding to the final destination of the arriving aircraft, a stock ticker display 766 that includes advertisement and stock information of particular interest to the arriving aircraft, and a textual news and alert display 768 that is customized to the arriving aircraft.

Although described above with reference to the FBOs and the aviation industry generally, those skilled in the art will recognize that the principles of locating, targeting, tracking and/or marketing services to potential or existing customers described herein are applicable to service providers generally. For example, with respect to land-based transportation, service providers such as convenience stores, gas stations or other typical en route service locations could employ the features of the personalized transportation system 100 to market services to auto travelers based on a stored profile and/or an assessment of the auto traveler's needs or wants.

In one embodiment of the present invention, the personalized transportation information system 100 is used to evaluate aviation or transportation-related business objectives. Examples of business objectives include, but are not limited to, on-time arrival, on-time performance, passenger comfort, minimized fuel consumption, regulatory compliance, least number of passengers missing connecting flights, cost of a flight, special treatment for VIP passengers, etc. The business objectives may be different for each operator, and, as noted above, may be entered or selected by the traveler or user 110, reflected in a profile or stored preferences for that traveler or user 110 or be obtained from the geographical-navigational reference database 300. For example, commercial carrier A may consider minimizing the number of passengers missing connecting flights as its most important business objective and passenger comfort level as a secondary business objective, whereas commercial carrier B may consider minimizing fuel consumption as most important, and the passenger comfort level as unimportant. Furthermore, the most important business objective can change for a single carrier depending on the flight/route or group of flights/routes. For example, a private carrier may consider shortest flight time as most important for one flight, and passenger comfort most as important for another flight, depending on the needs of the passengers on each of the flights.

Since weather conditions, predicted weather conditions or changes in operational parameters may have an impact on the flight plans of one or more aircraft, the personalized transportation and information system 100 can predict deviations from the business objectives incurred by impact of weather conditions or changes in operational parameters on one or more of the flights plans. Furthermore, the personalized transportation and information system 100 can suggest altered operational parameters or flight plans, or prioritize a sequence of departures and/or arrivals, that minimize the deviations from the business objectives or help achieve the desired business objectives for the relevant flights. The impacted aircraft may be on the ground awaiting departure or already en route to their destination. In one example, a dispatcher for a carrier has ten aircraft on the ground in Boston for a scheduled departure close to the time when a storm system is projected to be approaching the airport. The carrier's primary business objective is to minimize missed passenger connections. Based on the operational parameters, including the business objectives, as well as the current and/or predicted weather conditions, the personalized transportation and information system 100 predicts that the airport departure rate will be reduced by 50% as a result of the incoming storm, thus allowing only five of those ten aircraft to depart on schedule. The personalized transportation and information system 100 (e.g., in the form of a travel briefing in a briefing viewer 180, a map viewer 170, interface screen 160 or ranking interface screen 150) presents a suggested ordering for departure and updated flight plans based on minimizing the number of passengers who will miss connections if their flight cannot depart on schedule.

In another example, an airline may be cost conscious regarding fuel expenditures. From the weather data, it is predicted that all westbound, trans-continental flights during a certain time period will experience high headwinds, thereby decreasing fuel efficiency. The personalized transportation and information system 100 may determine that on a cross-country route listed non-stop, it is more cost effective to lighten the aircraft by reducing the fuel loaded at the departure airport, land at an intermediate destination, refuel and continue to the destination airport, even though the flight is listed as non-stop and such an intermediate stop would inconvenience many of the passengers.

In one embodiment of the present invention, the personalized transportation information system 100 is configured to provide an indicator of changes to operational parameters that are occurring or have occurred at an airport. Examples of changes to operational parameters with respect to a particular airport include runway configuration, runway utilization, ground delays, and ground stops, all of which affect the AAR for that airport. In one embodiment, by tracking the actual flight routes used by arriving aircraft and comparing against standard arrival routes into the airport, common aircraft holding patterns can be detected for arriving flights, potentially in advance of official notification by the airport (or other entity) that delays are occurring or a ground stop is or will be implemented.

Figure 29:
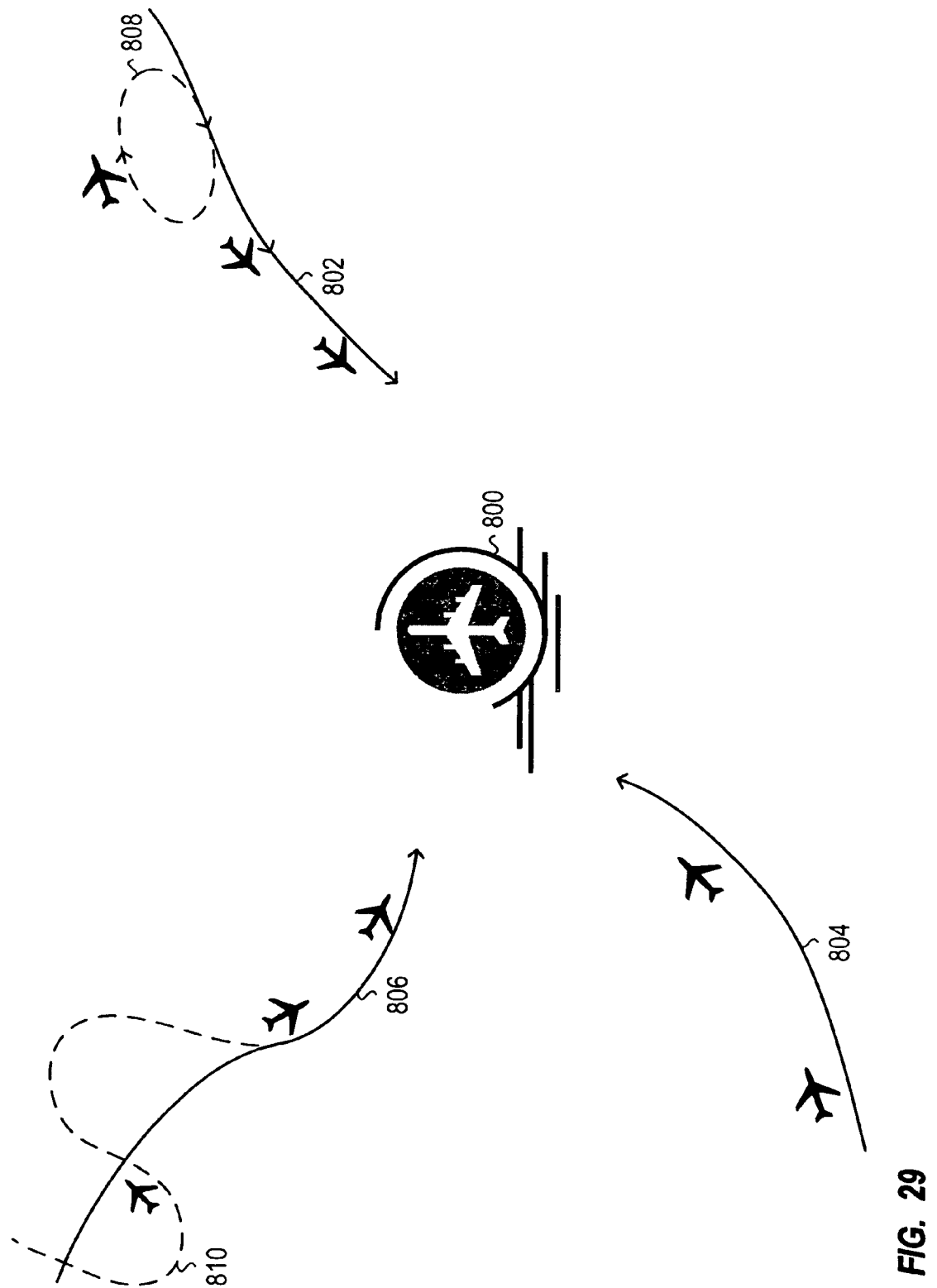
FIG. 29 is an example of determining an arriving flight holding pattern in accordance with the personalized transportation information system of FIG. 1.

Referring to FIG. 29, three standard arrival routes 802, 804, 806 into airport 800 are shown. In general, the standard arrival routes into an airport are dependent on a number of factors (e.g., the orientation of the airport runways, present runway configuration, weather, restricted airspaces, noise abatement concerns, geographic or topographic features, etc). The approved flight plan of an aircraft arriving into airport 800 includes one of the standard arrival routes 802, 804, 806. In the event of air traffic congestion, ground delays or stoppages at airport 800, arriving aircraft may be placed in a holding pattern as is well know by those skilled in the art. FIG. 29 shows two common holding patterns, an S-pattern 810 and oval 808, where the dashed lines indicate a deviation from one of the standard arrival routes (the solid lines). By monitoring the actual flight route of incoming aircraft and comparing it with the standard arrival routes, the occurrence of the delay patterns 808, 810 can be detected by the personalized transportation information system 100. Such detection may be accomplished by using computer-based or automatic pattern recognition, pattern matching or algorithmic detection. That is, in this embodiment, detected or observed radar data or other tracking (e.g., Global Positioning System) data indicating the position of an aircraft is tracked and analyzed to determine whether the position of the aircraft at certain points in time are consistent with an on-going flight path (either specific to that aircraft or in general) or whether a particular set of readings indicates that the aircraft has deviated from that flight path and perhaps entered a holding pattern.

The personalized transportation information system 100 may indicate to the traveler or user 110 that it has detected one or more aircraft entering a holding pattern by providing an alert through the generate alerts use case 130 and/or the alert generator 500 as discussed herein. Even if the pattern recognition detects a deviation from an established flight path, but does not determine that the aircraft has entered a standard holding pattern, the personalized transportation system 100 may nonetheless determine or alert the traveler or user 110 that the aircraft has deviated more than a pre-determined amount from the appropriate flight path, thereby indicating the need for potential corrective action.

For example, if an aircraft on arrival route 802 starts to deviate into an oval 808, the personalized transportation information system 100 determines that a potential hold is starting to build on arrival route 802. In order to increase the confidence of this prediction, the hold may not be reported until the aircraft executes a second oval or until another aircraft along the same route also shows evidence of initiating the oval holding pattern 808. This early indication of potential holds on one or more arrival routes into an airport can be useful to a operator in selecting a flight route of an aircraft into airport 800 that has not departed from it location of origin, or in altering a flight route for an aircraft already en route to airport 800. If arrival routes 802 and 806 are determined to have significant delays, but arrival route 804 is showing no delay, a flight plan that includes arrival route 804 might be the best choice for an on-time arrival, even if it requires a flight route that is not optimal with respect to flight distance or fuel consumption.

In another example, a flight already en route to airport 800 with arrival route 806 included in its flight plan, was not expecting any in-flight delays, and therefore does not have sufficient fuel for an extended hold into airport 800. Rather than divert to another airport at considerable cost to the airline, the arriving flight may have sufficient fuel to land safely by altering the flight plan to include the non-delayed arrival route 804.

Figure 30:
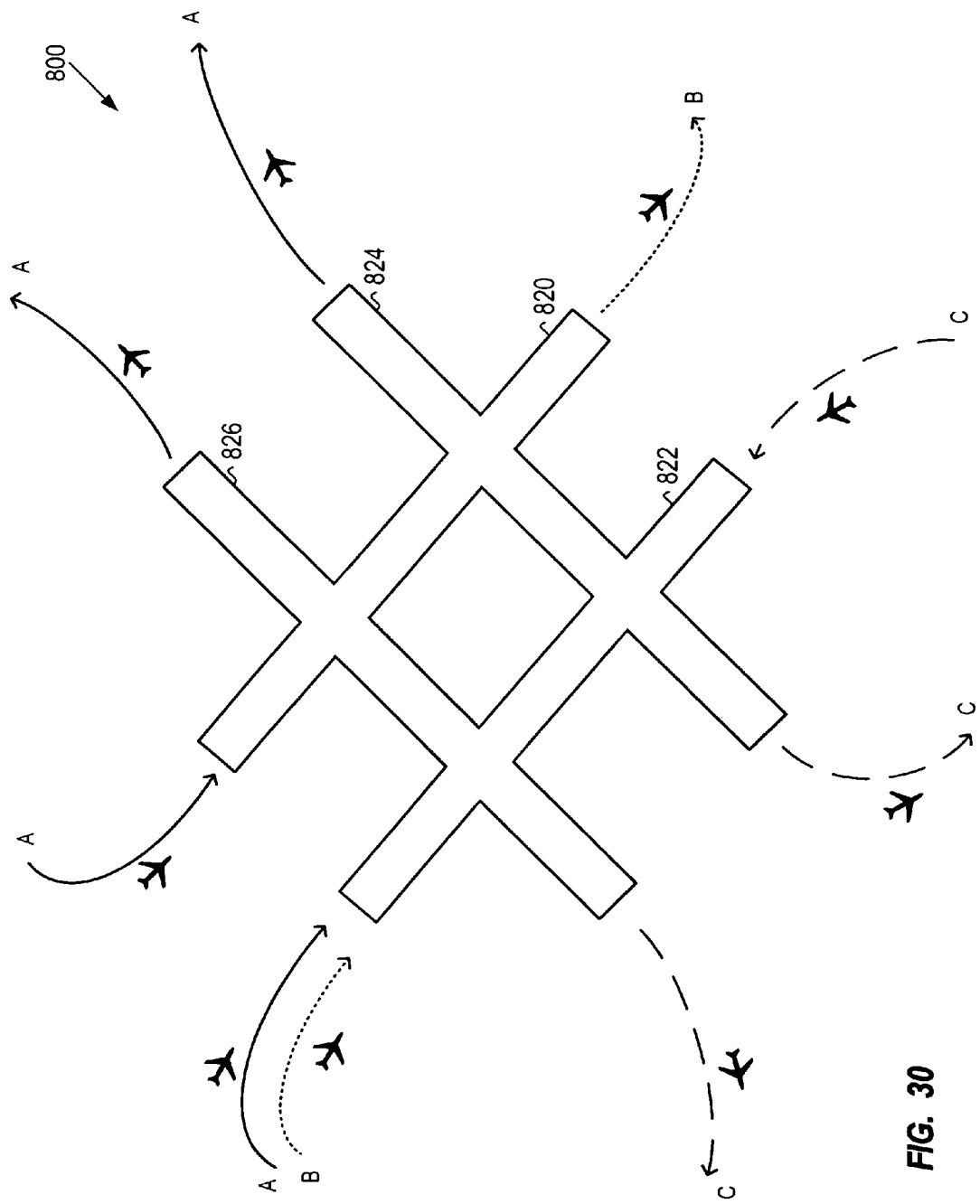
FIG. 30 is an example of determining runway configuration and utilization in accordance with the personalized transportation information system of FIG. 1.

In an alternate embodiment, the personalized transportation information system 100 predicts changes in AAR or ADR by looking for changes in the operational parameters associated with an airport. Referring to FIG. 30, airport 800 contains four runways 820, 822, 824, and 826. One possible runway configuration for airport 800 is departures on runways 824 and 826 to the upper right and arrivals on runways 820 and 822 from the upper left. A possible utilization A for this configuration is shown in FIG. 30 by the solid lines, where two runways 824, 826 are used for departure, and two runways 820, 822 are used for arrivals. Another possible configuration is that runways 820, 822 are used for arrivals from the upper left and departures to the lower right, and runways 824 and 826 are not in use. A possible utilization B, shown in FIG. 30 by the dotted lines, is that runway 822 is used only for arrivals and runway 820 is used only for departures. In a third example of a possible runway configuration for airport 800, departures on runways 824 and 826 are to the lower left and arrivals on runways 820 and 822 from the lower right. A possible utilization C for this configuration is shown in FIG. 30 by the dashed lines, where two runways 824, 826 are used for departure, and one runway 822 is used for arrivals. By monitoring the actual flight routes of arriving and departing aircraft or changed thereto (i.e., through pattern recognition discussed above), the personalized transportation information system 100 can determine the configuration and utilization of the airport and predict the AAR based on the operational parameters and the weather data.

In addition, if the personalized transportation information system 100 detects changes in the configuration and utilization for an airport, a prediction of the AAR at future times based on these changes, potentially before official notice has been given by the airport of such changes, may be given to the traveler or user 110 through an appropriate briefing, alert or viewing function in connection with the personalized transportation information system 100. Early realization of changes in airport configuration and utilization may allow an airline to make decisions relevant to business objectives, for example, releasing or holding flights at an airport of origin based on information about a predicted future state of an AAR at a destination airport, or selecting routes based on projected destination airport runway availability or utilization that maximize the probability of an on-time arrival, or minimize fuel consumption.

Figure 31:
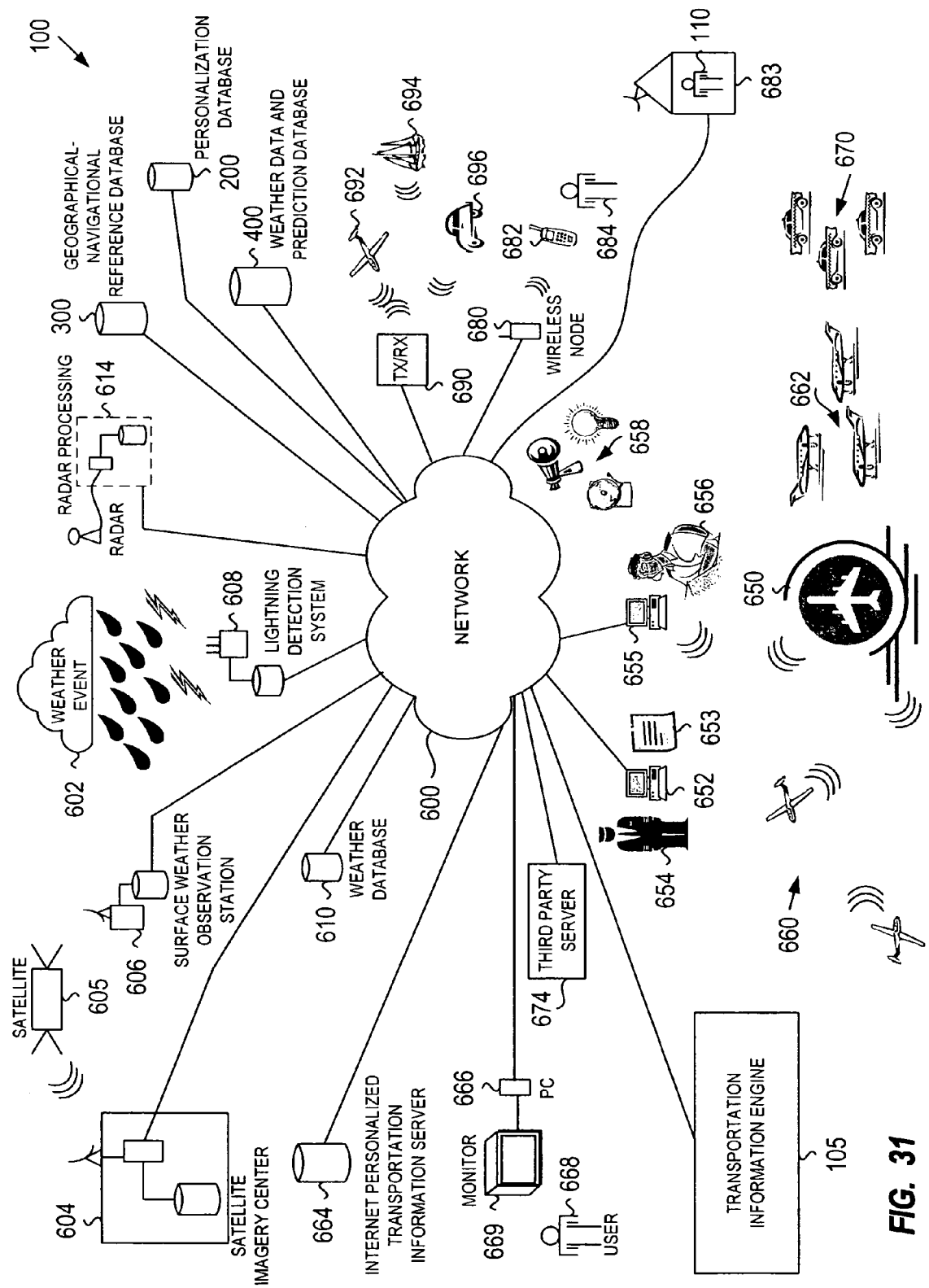
FIG. 31 is a system diagram of an implementation in accordance with one embodiment of the personalized transportation system.

Referring to FIG. 31, in one embodiment, the personalized transportation system 100 collects data related to weather phenomena and other ground and atmospheric conditions at various locations including, among other systems, satellite imagery centers 604 that receive data from satellites 605, surface weather observation stations 606, lightning detection systems 608, and/or radar processing stations 614. Such weather related data may be transferred over a variety of public and/or private wired and wireless networks 600 generally known in the art, including the Internet, to the relevant portions of the personalized transportation system 100. Subsets of these data collection apparatuses may provide particular data relevant to characterizing of one or more storms, weather events or objects 602.

Previously gathered and/or analyzed data may be present in one or more weather databases 610. Additional data may also be gathered from vehicles or mobile transmitters/receivers, including aircraft 692, ships 694 and ground transportation 696, along with information regarding their locations. Vehicles may transmit, receive, or transmit and receive to and from one of a system of transmitters and receivers 690. The system may also collect some types of data from mobile users 684 using handheld or portable devices 682 via a wireless network 680. Such data may include one or more of weather-related data, imagery, video, audio, or related position information. Data from each source may be produced in different formats.

In one embodiment, the personalized transportation system 100 (e.g., the weather data and prediction system or database 400) processes collected weather data and identifies particular weather events or storms 602 and their characteristics, attributes and parameters. The personalized transportation system 100 applies forecasting and other prediction techniques, including predictive models to predict future weather data and parameters of predicted weather conditions, events and storms, including location, wind velocity, hail size, lightning flash rate, flood potential, or any other weather or storm related attribute generally known in the art. Moreover any relevant, known forecasting or weather prediction method, system or mechanism may be used to obtain predicted future weather conditions, data, characteristics or events. Results of the weather data analysis and prediction(s) may be stored in the weather data and prediction database 400.

In one embodiment, one or more data sources, including the weather data collection sources noted above, the weather databases 610, the personalization database 200, the geographical-navigation reference database 300 and the weather data and prediction system or database 400, provide information, including relevant weather data and predictions and operational parameters, over the network 600 to the transportation information engine 105. Such information may be provided in any format or protocol generally known in the art, including an extensible markup language format. The transportation information engine 105 provides personalized transportation information as previously described to the traveler or user 110 as previously described.

The personalized transportation information or other data or information produced by the transportation information engine 105 may reside on a PC or server, or distributed servers (not shown). It could use commercial or open source database platforms such as Oracle, Microsoft SQL Server, MySQL, or PostgreSQL. The transportation information engine 105 may provide external communication through database connections, custom interfaces, or a web application server, or any other communications medium or system generally known in the art.

Portions or all of the personalized transportation information may be transferred to an Internet or networked personalized transportation server 664. The personalized transportation server 664 may be a simple PC, a web server, a combination of separate web server, application server, and database server, or other arrangement of server resources. The Internet personalized transportation server 664 could provide personalized transportation information over the network 600 to other network systems or to PCs 666 with attached monitors 669 displaying Internet browsers or other applications operated by users 668. The users 668 may be similar to the traveler or user 110 previously described. In another embodiment, the Internet personalized transportation server 664 is accessed by mobile users 684 of portable devices 682 via the wireless communication network 680.

The Internet personalized transportation server 664 could serve a web page containing both HTML and JavaScript code. The JavaScript code could periodically, or upon user interaction, obtain additional or more up-to-date transportation information from the personalized transportation server 664 without reloading the web page. In one embodiment, the data is in extensible markup language form.

Personalized transportation information may also be provided by the transportation information engine 105 to a third-party server 674. In one embodiment, the traveler or user 100 of the personalized transportation information system 100 could provide data to third-parties, who would then provide value-added analysis or repackaging of the data.

In one embodiment, data from the personalized transportation information system 100 is used by third-parties to provide value-added services. For example, a search engine operator may provide recent transportation results in response to transportation-related keywords. For instance, an Internet search for "flight-plan Orlando" could produce a near current map of suggested flight routs and relevant operational parameters en route to Orlando. The graphical results could be provided with regions responsive to further user input, allowing the user to trigger display of additional information about a selected storm. Similarly, a search for "flight delays tomorrow" could trigger access to a forecast portion of the personalized transportation server 664 to provide predicted aviation-related delays for particular geographic areas. In each case, the search could be conducted on data transmitted to the search engine provider's database, or via calls to the personalized transportation server 664 or similar resource provided on the network 600.

In one embodiment, the transportation information engine 105 provides personalized transportation information and/or updates thereto to airports 650 or other types of transportation hubs or centers (not shown) or other similar locations or devices previously described. The personalized transportation information transfers could be full or incremental and, in one embodiment, could be accomplished using the transfer of extensible markup language (XML) data. For example, airports 650 (or associated databases or systems) could send relevant personalized transportation information to one or more en route aircraft 660, one or more non-airborne aircraft 662, or some combination thereof. Such transmissions could be via wireless data transfer or any other mechanism generally known in the art. A traffic or land-based transportation hub or dispatcher could send such personalized transportation information to, for example, a fleet of vehicles 670, such as taxis or buses.

In one embodiment, the transportation information engine 105 provides personalized transportation information and/or updates thereto to user terminals or kiosks 652. A pilot 654 or other traveler or user 110 may utilize the kiosk 652 to interface with the personalized transportation system 100, including to input relevant or desired preferences or operational parameters and/or to receive desired or corresponding personalized transportation information. The kiosk 652 may provide the pilot with a travel briefing 653 or other output as previously described.

In one embodiment, a dispatcher or company representative 656 obtains personalized transportation information via a terminal, monitor or other computer interface 655. The dispatcher 656 may similarly receive relevant travel briefings 653. Information obtained by the dispatcher may be forwarded to airports 650 or other transportation hub or directly to the transportation vehicles 660, 662, 670, 692, 694, 696 themselves.

In one embodiment, the transportation information engine 105 provides alerts via alert devices 658 (e.g., horns, sirens, lights, etc.) to the pilot 654, traveler or user 110, dispatcher 656 or directly to the aircraft or other transportation vehicles 660, 662, 670, 692, 694, 696. Alerts may be generated and transmitted electronically for display as e-mail, visual indications on a display containing the route, or be embodied as other audible alerts or messages.

In another embodiment, personalized transportation information from the personalized transportation system 100 and/or the transportation information engine 105 is also provided to Internet or network users 668. The transportation information could be presented via a web-based interface through an Internet browser or customer application on the users' PCs 666 to allow interactive exploration of current and forecasted transportation information and related operational parameters. A user could enter the URL of a personalized transportation server 664. The server could attempt to distinguish the user's location from IP address information, from a previously stored browser cookie, or from user input. The user could also enter different operational parameters for which he wishes to obtain personalized transportation information.

The personalized transportation information system 100 and the associated sub-systems communicate with a vehicle or aircraft 660, 662, 670, 692, 694, 696 associated with the traveler or user 110 through a navigation and communication system 120 (see FIG. 1) connected to the network 600. The navigation and communication system 120 preferably comprises one or more methods of communication and/or communication media generally known to those skilled in the art. In the case of communication with aircraft, such communication links include data-radio (ACARS), VHF (audio), radio-satellite phone, Internet Protocol and/or a data link (INflight). As discussed, communication with the personalized transportation information system 100 may be directly with the aircraft or other transportation vehicle 660, 662, 670, 692, 694, 696, traveler or user 110 or pilot 654, or may be effected through one or more third parties, including, for example, a dispatcher 656 having full access and interface capabilities with the personalized transportation information system 100. Thus, a pilot 654 may access the personalized transportation information system 100 directly from the cockpit of an aircraft 660, 662, through the network of the commercial airline company or through an airport network. In an alternative embodiment, a traveler or user 110 or pilot 654 may access the personalized transportation information system 100 through a stand-alone travel kiosk 652 that is networked to the personalized transportation information system 100 through one of the aforementioned communication protocols, as described above.

For automotive or boating travel, communication may be directly with the automobile 696 or ship 694, with a personal data assistant 682 local to the driver or directly with a driver's home computer system. Thus, the personalized transportation system 100 and the information associated therewith may also be accessed through a traveler or user 110 in a house 683 via either a wireless or wired connection.

In contrast, in planning routes for trucking, it is likely, although not required, communication to the driver is effected through a dispatcher 656. Those skilled in the art will recognize that any of the aforementioned communication means or any others generally known in the art may be utilized by the navigation and communication system 120 to communication between the personalized transportation information system 100 and the traveler 110, no matter what the vehicle type.

The personalized transportation information system 100 thus provides transportation and weather information based on user profiles and transportation route information. Visualized transportation and weather information can be presented such that the impact of a weather or transportation condition along the route is displayed. In one embodiment, personalized transportation information may be obtained prior to departure to assist in transportation planning and/or after departure (i.e., en route) to assist in re-routing or altering transportation plans.

As previously discussed, the personalized transportation information system is applicable forms of transportation other that the air travel. For example, the personalized transportation information system could be utilized to provide route and briefing information to the driver of an automobile, taking into account traffic and weather, as well as predicted congestion, accidents or other incidents along the projected route.

The embodiments of the present invention may be implemented with any combination of hardware and software. If implemented as a computer-implemented apparatus, the present invention is implemented using means for performing all of the steps and functions described above.

The embodiments of the present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of the present invention is not limited to the particular examples and implementations disclosed herein, but is intended to cover modifications within the spirit and scope thereof as defined by the appended claims and any and all equivalents thereof.

We claim:

1. A computer-implemented method of determining a personalized transportation plan, the method comprising:
   (a) receiving operational parameters, wherein the operational parameters include non-weather related parameters and transportation vehicle characteristics, the transportation vehicle characteristics including at least one of vehicle type, vehicle model, performance characteristics, fuel efficiency, passenger capacity, and sensitivity to different types of weather;
   (b) receiving a user profile, wherein the user profile contains user transportation preferences;
   (c) receiving weather data;
   (d) determining, based on the weather data, a probability of re-direction of traffic into one or more transportation routes due to an effect of current and predicted future weather conditions on the one or more transportation routes and the operational parameters corresponding to each of the transportation routes;
   (e) determining a probability of an availability of the one or more transportation routes during an expected travel time based on the probability of the re-direction of the traffic into the one or more transportation routes;
   (f) generating the personalized transportation plan in accordance with the user transportation preferences, the plan including one of the transportation routes predicted to be available during the expected travel time; and
   (g) presenting the personalized transportation plan to a user.

2. The method of claim 1, wherein the operational parameters include a starting location and an ending location.

3. The method of claim 2, wherein the operational parameters include at least one intermediate location that is temporally positioned after the starting location and before the ending location.

4. The method of claim 1, wherein the operational parameters include a departure time.

5. The method of claim 1, wherein the operational parameters include an arrival time.

6. The method of claim 1, wherein the operational parameters include transportation environment characteristics, the transportation environment characteristics including at least one of airport runway configuration, airport acceptance rate, airport departure rate, air traffic congestion, and airspace restrictions.

7. The method of claim 1, wherein the weather data includes a disruptive weather condition.

8. The method of claim 1, wherein the personalized transportation plan includes an air transportation route.

9. The method of claim 1, wherein the personalized transportation plan includes a land transportation route.

10. The method of claim 1, wherein the personalized transportation plan includes a water transportation route.

11. A computer-implemented method of determining a personalized transportation plan, the method comprising:
    (a) receiving operational parameters, wherein the operational parameters include non-weather related parameters and transportation vehicle characteristics, the transportation vehicle characteristics including at least one of vehicle type, vehicle model, performance characteristics, fuel efficiency, passenger capacity, and sensitivity to different types of weather;
    (b) receiving a user profile, wherein the user profile contains user transportation preferences;
    (c) generating the personalized transportation plan, including a first transportation route, based on the operational parameters and the user profile;
    (d) receiving weather data including current and future predicted weather conditions along the first transportation route;
    (e) predicting a change effected by the weather data to at least one of the operational parameters corresponding to the first transportation route, the prediction based on statistical and historical analysis of an impact of the weather data on the first transportation route during an expected travel time;
    (f) modifying the personalized transportation plan to include a second transportation route determined in accordance with the user transportation preferences and the predicted change to the at least one of the operational parameters; and
    (g) presenting the personalized transportation plan to a user.

12. The method of claim 11, wherein the operational parameters include a starting location and an ending location.

13. The method of claim 12, wherein the operational parameters include at least one intermediate location that is temporally positioned after the starting location and before the ending location.

14. The method of claim 11, wherein the operational parameters include a departure time.

15. The method of claim 11, wherein the operational parameters include an arrival time.

16. The method of claim 11, wherein the operational parameters include transportation environment characteristics, the transportation environment characteristics including at least one of airport runway configuration, airport acceptance rate, airport departure rate, air traffic congestion, and airspace restrictions.

17. The method of claim 11, wherein the personalized transportation plan includes an air transportation route.

18. A computer-implemented method of determining a flight plan, the method comprising:
- (a) receiving weather data, operational parameters, and user transportation preferences, wherein the operational parameters include non-weather related parameters and transportation vehicle characteristics, the transportation vehicle characteristics including at least one of vehicle type, vehicle model, performance characteristics, fuel efficiency, passenger capacity, and sensitivity to different types of weather;
- (b) determining a first flight route and one or more alternate flight routes in accordance with the operational parameters and the user transportation preferences;
- (c) determining, based on the weather data, a probability of current and future predicted weather conditions occurring along the first flight route during an expected travel time, the probability of the weather conditions occurring affecting the availability of the first flight route;
- (d) determining a probability of re-direction of aircraft traffic into the one or more alternate flight routes;
- (e) determining a probability of availability of the one or more alternate flight routes during the expected travel time based on the probability of the re-direction of the aircraft traffic into the one or more alternate flight routes; and
- (f) generating the flight plan in accordance with the user transportation preferences that includes at least one of the alternate flight routes predicted to be available during the expected travel time.

19. The method of claim 18, further comprising:
- (g) predicting a change effected by the weather data to at least one of the operational parameters corresponding to the at least one of the alternate flight routes included in the flight plan, wherein the predicted change to the at least one of the operational parameters changes the availability of the one of the alternate flight routes;
- (h) modifying the flight plan in accordance with the user transportation preferences and the predicted change to the at least one of the operational parameters.

20. The method of claim 19, wherein modifying the flight plan includes retaining the at least one of the alternate flight routes and changing the departure time.

21. The method of claim 18, wherein the at least one of the alternate flight routes is selected for the flight plan based on route ranking parameters determined from the user transportation preferences applied to each of the alternate flight routes.

22. The method of claim 18, wherein the one or more flight routes include at least one of flight routes created by the user and flight routes automatically generated by a transportation information engine in accordance with the user transportation preferences and the operational parameters.

23. The method of claim 18, wherein the operational parameters include transportation environment characteristics, the transportation environment characteristics including at least one of airport runway configuration, airport acceptance rate, airport departure rate, air traffic congestion, and airspace restrictions.

24. The method of claim 18, wherein the first flight route is predicted to be unavailable during the expected travel time due to the probable occurrence of the weather conditions along the first flight route.

25. The method of claim 18, wherein determining the probability of the re-direction of the aircraft traffic into the one or more alternate flight routes includes a statistical and historical analysis of impact of the weather data on the one or more alternate flight routes and the respective operational parameters.

* * * * *